(12) United States Patent
Oswald et al.

(10) Patent No.: US 9,359,068 B2
(45) Date of Patent: Jun. 7, 2016

(54) DRIVE UNIT FOR AIRCRAFT RUNNING GEAR WHEELS

(75) Inventors: Johann Oswald, Eschenlohe (DE);
Manfred Heeg, Starnberg (DE)

(73) Assignee: L-3 COMMUNICATIONS MAGNET-MOTOR GMBH, Starnberg (DE)

( * ) Notice: Subject to any disclaimer, the term of this patent is extended or adjusted under 35 U.S.C. 154(b) by 216 days.

(21) Appl. No.: 14/125,269

(22) PCT Filed: Jun. 17, 2011

(86) PCT No.: PCT/EP2011/060172
§ 371 (c)(1),
(2), (4) Date: Mar. 12, 2014

(87) PCT Pub. No.: WO2012/171589
PCT Pub. Date: Dec. 20, 2012

(65) Prior Publication Data
US 2014/0225421 A1    Aug. 14, 2014

(51) Int. Cl.
*B64C 25/50* (2006.01)
*B64C 25/40* (2006.01)
*B64C 5/02* (2006.01)
*B60K 7/00* (2006.01)

(52) U.S. Cl.
CPC ............. *B64C 25/405* (2013.01); *B64C 5/02* (2013.01); *B60K 2007/003* (2013.01); *Y02T 50/823* (2013.01)

(58) Field of Classification Search
CPC ...... B64C 25/405; B64C 25/40; B64C 25/34; Y02T 50/823
USPC .............. 244/50, 100 R, 103 S, 111; 74/13; 180/53.1, 65.51, 65.6, 65.7
See application file for complete search history.

(56) References Cited

U.S. PATENT DOCUMENTS

| 2,290,126 A | * | 7/1942 | Flink | A01C 15/08 180/53.1 |
| 3,005,510 A | | 10/1961 | Philips | |
| 4,659,039 A | | 4/1987 | Valdes | |
| 8,979,019 B2 | * | 3/2015 | Christensen | B64C 25/405 244/100 R |

(Continued)

FOREIGN PATENT DOCUMENTS

| CN | 102083686 | 6/2011 |
| JP | 03-295796 | 12/1991 |
| RU | 2167786 C1 | 5/2001 |
| RU | 2384467 C2 | 3/2010 |

OTHER PUBLICATIONS

International Search Report in corresponding application PCT/EP2011/060172, pp. 1-2, dated Mar. 7, 2012.

(Continued)

*Primary Examiner* — Timothy D Collins
*Assistant Examiner* — Richard G Davis
(74) *Attorney, Agent, or Firm* — Brinks Gilson & Lione

(57) ABSTRACT

A drive unit (16) for an aircraft running gear (2) having at least a first wheel (4) and a second wheel (6) on a common wheel axis (A), wherein the drive unit (16) is drivingly coupleable to at least one of the first and second wheels (4, 6), is characterized in that the drive unit (16) comprises at least one power output assembly (122, 124) for driving at least one of the first and second wheels (4, 6), with each of the at least one power output assembly (122, 124) comprising a power transmission chain (136) selectively engageable with a sprocket element (108, 110) coupled to one of the first and second wheels (4, 6).

51 Claims, 9 Drawing Sheets

(56) References Cited

U.S. PATENT DOCUMENTS

2010/0147995 A1    6/2010  Cros et al.
2012/0217340 A1*  8/2012  Essinger ............... B64C 25/405
                                              244/50

OTHER PUBLICATIONS

International Preliminary Report on Patentability issued in corresponding application PCT/EP2011/060172, pp. 1-4, dated Sep. 16, 2013.

* cited by examiner

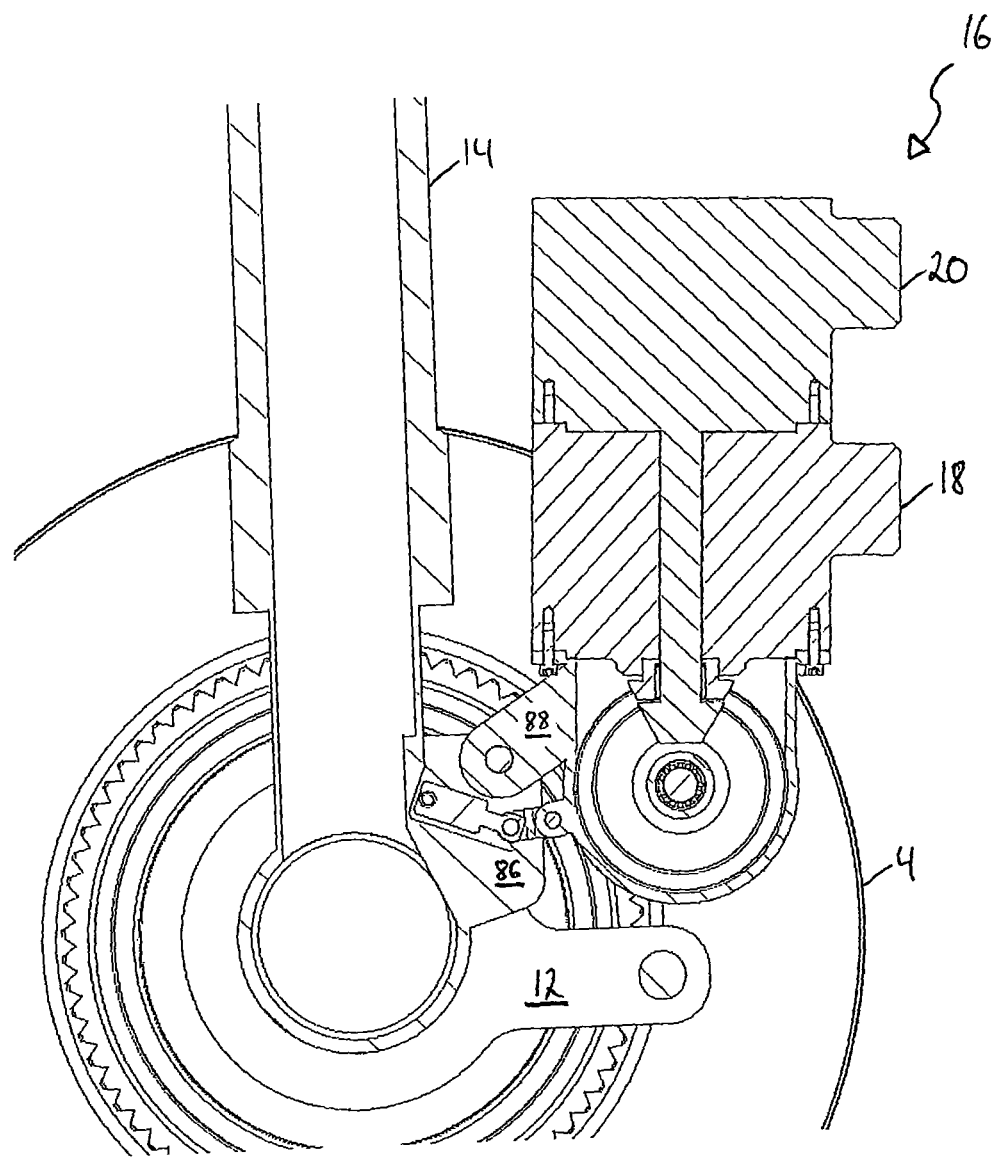

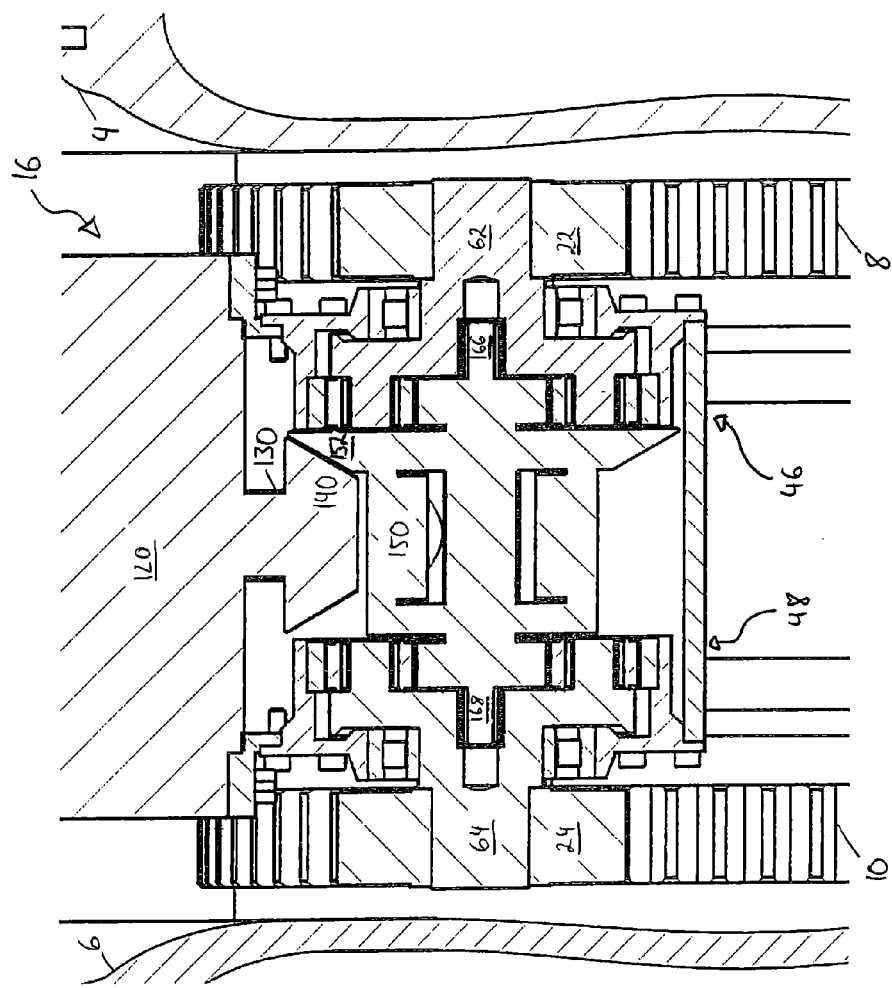

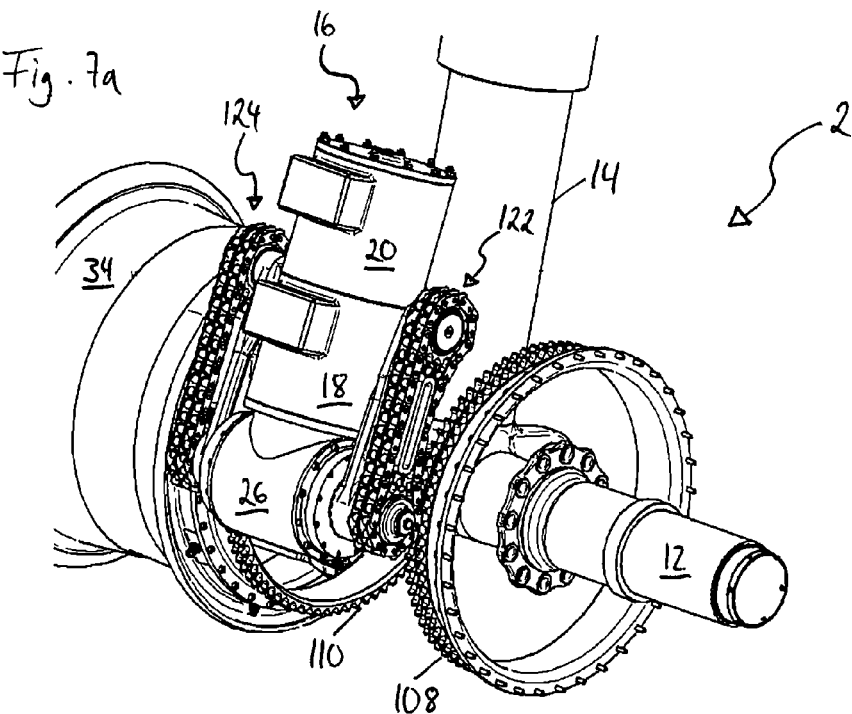
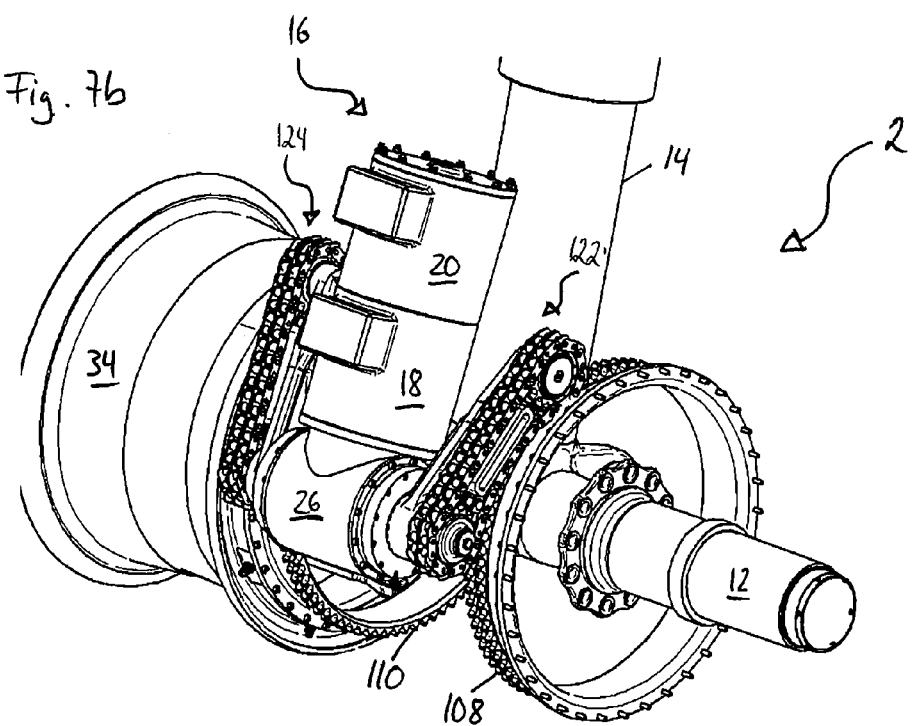

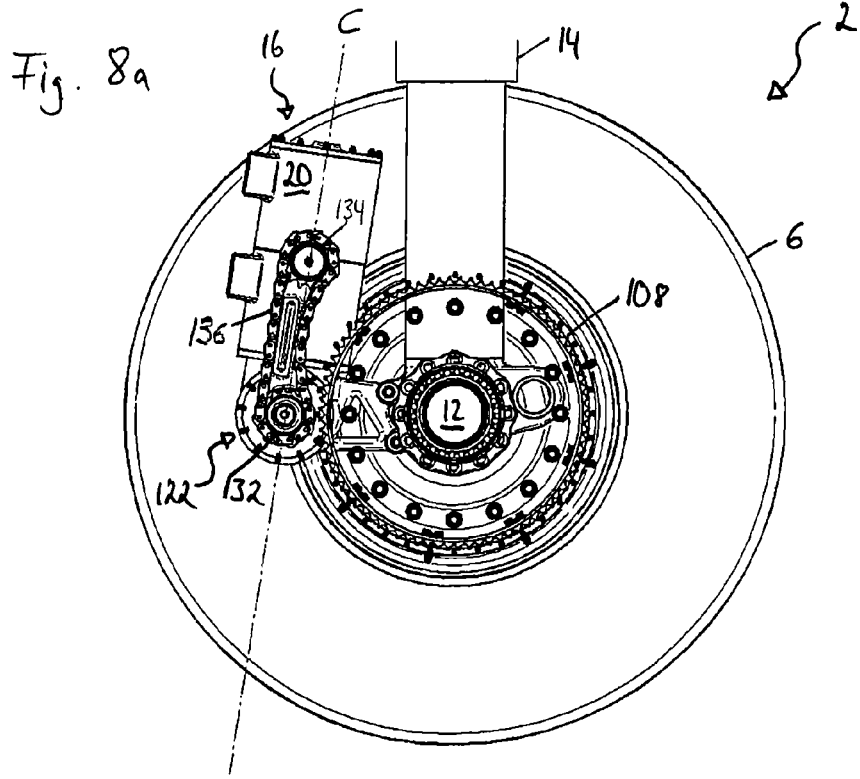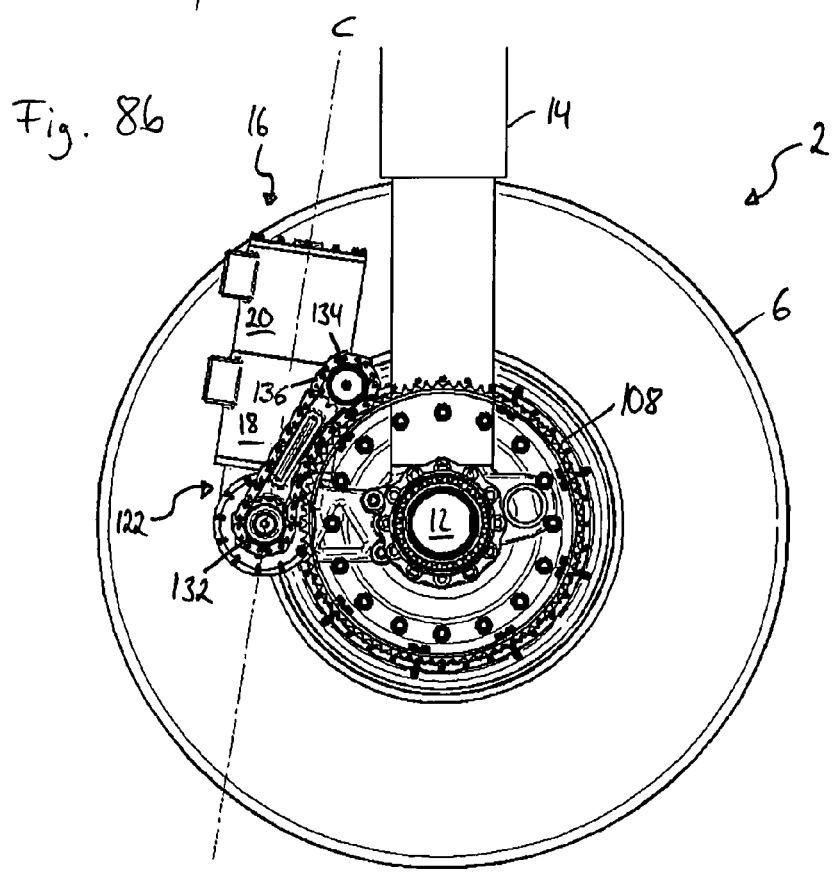

DRIVE UNIT FOR AIRCRAFT RUNNING GEAR WHEELS

RELATED APPLICATIONS

The present application claims the benefit under 35 U.S.C. §371 of International Patent Application No. PCT/EP/2011/060172, having an internal filing date of Jun. 17, 2011, the content of which is incorporated herein by reference in its entirety.

FIELD OF THE INVENTION

The present invention is directed to a drive unit for an aircraft running gear and to an aircraft running gear comprising a drive unit.

BACKGROUND ART

Conventionally, large commercial aircraft, also referred to as airplanes hereinafter, use their gas turbine engines to taxi on an airfield or maneuvering area of an airport. As the gas turbine engines of airplanes are not designed to operate efficiently in a low power state, such as needed during the taxiing operation on the ground, maneuvering of the aircraft on the ground consumes a lot of fuel. Increasing fuel prices have made this fuel consumption during taxiing more and more worrisome. Moreover, the fuel efficiency for the whole flight decreases due to the large amount of fuel that has to be carried during the flight for taxiing at the destination airport. Alternatively, special vehicles are used to drag or push airplanes on an airfield. However, since such special vehicles are expensive themselves and not available in large numbers at most airports, they are commonly only used for short distances, such as the push-back operation from the gate. This again leads to the gas turbine engines being used for most of the taxiing, which causes above described disadvantages.

Alternative solutions for taxiing of aircraft have been suggested in the prior art. DE10 2008 006 295 A1 discloses an electric motor mounted onto a running gear leg of an aircraft. The electric motor comprises a motor shaft, which can be moved axially between different positions in order to engage/disengage with the wheel structure of the aircraft running gear and drive the wheel.

Although improvements could be achieved with such approaches, it has been found that—especially for large commercial aircraft—these approaches did not yield satisfying results in terms of durability/service life, when attempting to supply the necessary power to drive the aircraft without the help of the turbine engines.

SUMMARY OF THE INVENTION

Accordingly, the problem underlying the present invention is to provide a drive for an aircraft running gear that allows for supplying the necessary power to taxi large commercial aircraft, such as common passenger aircraft, while having an increased service life.

This problem is solved by a drive unit in accordance with claim 1.

The claimed drive unit for an aircraft running gear having at least a first wheel and a second wheel on a common wheel axis, wherein the drive unit is drivingly coupleable to at least one of the first and second wheels, is characterized in that the drive unit (16) comprises at least one power output assembly for driving at least one of the first and second wheels, with each of the at least one power output assembly comprising a power transmission chain selectively engageable with a sprocket element coupled to one of the first and second wheels. In particular, the drive unit may be drivingly coupleable to exactly one of the first and second wheels and may comprise exactly one power output assembly for driving the exactly one of the first and second wheels, with the exactly one power output assembly comprising a power transmission chain selectively engageable with a sprocket element coupled to the exactly one of the first and second wheels.

It is also possible that the drive unit is drivingly coupleable to both the first and the second wheel. In particular, according to a further embodiment, the drive unit is drivingly coupleable to both the first and second wheels, wherein the drive unit comprises a first and a second power output assembly for driving a respective one of the first and second wheels, with each power output assembly comprising a power transmission chain selectively engageable with a respective sprocket element coupled to the respective wheel. Accordingly, it is explicitly disclosed that the drive unit for an aircraft running gear having at least a first wheel and a second wheel on a common wheel axis, wherein the drive unit is drivingly coupleable to the first and second wheels, may be characterized in that the drive unit comprises a first and a second power output assembly for driving a respective one of the first and second wheels, with each power output assembly comprising a power transmission chain selectively engageable with a respective sprocket element coupled to the respective wheel.

Providing the drive unit in such a way that each power output assembly, in particular the one power output assembly present or each of a first and a second power output assembly, comprises a power transmission chain selectively engageable with a sprocket element of a respective wheel has a number of advantages. A power transmission chain has proven to be relatively insensitive to the highly adverse operating conditions of a drive unit for an aircraft running gear, in contrast to other transmissions like spur gears used in previous approaches for engagement/disengagement. Aircraft running gears are exhibited to a plurality of adverse influences, such as large temperature differentials, a large variety of climatic conditions around the globe (such as for example very humid conditions), salt and de-icing chemicals used for de-icing aircraft components and runways, etc. Many of these influences are very aggressive in attacking the integrity of the aircraft running gear components, leading to corrosion and other detrimental processes. This is especially true because salt and chemicals may be stuck to the aircraft running gear for hours during the whole flight, before they can be cleaned after landing. E.g. spur gears that are tempered with by these aggressive influences are prone to failing under the large loads in driving commercial aircraft. By employing a power transmission chain at the output stage of the drive unit, a highly durable engagement/disengagement mechanism between the drive unit and the wheels of the aircraft running gear is provided. The power transmission chain is less sensitive to corrosion due to its structure. Moreover, even in the event of corrosion taking place, the power transmission chain's functionality is less sensitive to chemical processes on its surface and less susceptible to degradation of the functionality, when the exact dimensions of the power transmission chain may not be maintained due to the adverse effects. Accordingly, the power transmission chain is more durable under the high forces transmitted by a drive unit of an aircraft running gear when driving the aircraft.

The power transmission chain as a whole is selectively engageable with the sprocket element of the wheel. Accordingly, when the power transmission chain is in a position of disengagement from the sprocket element, no connection between the drive unit and the first and second wheels is present, such that the aircraft wheels can rotate independently from the drive unit. In this way, it is safely ensured that the speed of the wheels can adjust to the speed of the aircraft without resistance generated by the drive unit, for example when landing the aircraft. In other words, the inventive, selectively engageable power transmission chain is fundamentally different from a transmission chain running over a sprocket of a drive unit and a sprocket of a wheel of the aircraft running gear, since such an arrangement could not be completely disengaged and is therefore not selectively engageable in the sense of the invention.

The term selectively engageable is understood in such a way that the power transmission chain may be movable in operation between a position of engagement with the sprocket element of the wheel and a position of disengagement from the sprocket element of the wheel. In other words, the term selective engagement refers to time-selective engagement, i.e. the power transmission chain may be in engagement with the sprocket element at some points in time, whereas disengagement between the power transmission chain and the sprocket element may be present at other points in time. An actuator, such as an electric or hydraulic motor, may be provided for effecting such motion. A control unit may be provided, which controls the actuator and is able to command at any point in time if the power transmission chain is in said position of engagement or in said position of disengagement.

Providing the power transmission chain has the additional advantage that the extension of the power transmission chain allows for a spacial separation of the remainder of the drive unit, in particular the power train thereof, and the sprocket elements of the wheels. Consequently, the remainder of the drive unit may be positioned in the framework of the aircraft running gear with greater spacial freedom. In this way, an overall highly space efficient arrangement of the aircraft running gear, including the drive unit, may be achieved.

It is pointed out that the benefits achieved with power transfer via one or more power transmission chains are applicable to cases where one power output assembly is present, which is drivingly coupleable to one wheel, where two power output assemblies are present, which are drivingly coupleable to two wheels, and where even more than two power output assemblies are present, which are drivingly coupleable to two or more wheels.

According to a further embodiment, each power output assembly comprises a first sprocket wheel and a second sprocket wheel, with the power transmission chain running endlessly over the first sprocket wheel and the second sprocket wheel. In this way, a loop of the power transmission chain within the power output assembly is established. A portion of said loop may then be brought into engagement with the sprocket element of the respective wheel through an appropriate motion of the power output assembly. In this way, the power transmission chain is conveniently engageable with and disengageable from the sprocket element via moving one or both of the first and second sprocket wheels.

According to a further embodiment, the first sprocket wheel is drivingly coupled to a power train of the drive unit. In this way, the first sprocket wheel drives the power transmission chain, when the drive unit is in operation, which in turn drives the sprocket element, when in engagement. The term power train is intended to encompass each kind of drive or motor that may be suitable for driving the first sprocket wheel. The wording is further intended to encompass both of the two alternatives of one motor/drive and two motors/drives driving the two first sprocket wheels of the first and second power output assemblies. These alternatives will be described in more detail below.

According to a further embodiment, the second sprocket wheel is an idler sprocket wheel. In other words, only the first sprocket wheel is in operation driven by the power train of the drive unit. This allows for a highly flexible positioning of the second sprocket wheel, as no drivingly coupling between the second sprocket wheel and the power train of the drive unit has to be established. Alternatively, both the first sprocket wheel and the second sprocket wheel may be drivingly coupled to the power train of the drive unit. In this way, the required power transmission capabilities between the power train and the power transmission chain are split up between the two driven sprocket wheels, such that each of the first and second sprocket wheel is only required to transmit a portion of the required power—per power output assembly—from the power train to the power transmission chain. Therefore, the first sprocket wheel may be dimensioned for a lower power transmission capacity, allowing a more compact and durable design.

According to a further embodiment, the power transmission chain is in engagement with the first and second sprocket wheels on an inner side of the power transmission chain. In this way, a basic loop of the power transmission chain around the first and second sprocket wheels is established that is highly stable under the loads present during operation. In particular, the first and second sprocket wheels may be the only sprocket wheels in engagement with the inner side of the power transmission chain. In a particular embodiment, the power transmission chain does not exhibit any sort of twist, such that a particularly smooth and stable running of the power transmission chain over the first and second sprocket wheels during operation is achieved.

According to a further embodiment, the power transmission chain is selectively engageable with the sprocket element on an outer side of the power transmission chain. In particular, the sprocket element may be the only sprocket element that is engageable with the outer side of the power transmission chain. Accordingly, the engagement of the power transmission chain with the sprocket element of the wheel takes place at the side of the power transmission chain opposite the side running over the first and second sprocket wheels. In particular, the loop around the first and second sprocket wheels may be implemented with small first and second sprocket wheels as compared to the sprocket element of the wheel, with the portion of the loop between the first and second sprocket wheels providing an extended engagement section for engagement with the sprocket element. Such an extended engagement section allows for providing an extended area of power transfer from the power transmission chain to the sprocket element, which allows for transferring the required high forces. Moreover, the different sizes of the first sprocket wheel and the sprocket element of the wheel provide for an output gear ratio that reduces the torque requirements of the motor(s), such that more compact motor(s) can be used.

According to a further embodiment, the endless power transmission chain defines a loop and is selectively engageable with the sprocket element in a preset engagement section of the loop. It is apparent that the power transmission chain endlessly passes the preset engagement section, such that different sets of chain links are repeatedly present in the preset engagement section. In a particular embodiment, the engagement section is between the first and second sprocket wheels.

According to a further embodiment, a guiding of the power transmission chain in the engagement section is provided, the guiding preferably being adapted to a shape of the sprocket element. In particular, a radius of the guiding may adapted to the radius of the sprocket element. In this way, the engagement section may be made use of very efficiently, as a close engagement along the engagement section is achieved. In particular, the radius of the guiding in the engagement section may be slightly greater than the radius of the sprocket element of the wheel, such that a smooth transition between engaged portions of the power transmission chain and disengaged portions of the power transmission chain at the edges of the engagement section is provided.

Alternatively, the shape of the loop of the power transmission chain may adapt to the sprocket element of the wheel without guiding, the adapting taking place when coming into an engaged position. Such adaptation may be achieved by the tension imposed on the power transmission chain by the first and second sprocket wheels in combination with the pressure exerted by the sprocket element of the wheel when getting into contact with the power transmission chain. For maintaining tension within the power transmission chain in the state of disengagement between the power transmission chain and the sprocket element, the first and second sprocket wheels may be displaceable with respect to each other. An actuator may be provided for effecting such displacement.

According to a further embodiment, the loop is convex with the exception of the engagement section where the loop is concave. It is understood that the concave portion of the loop does not necessarily correspond exactly to the engagement section, as a transition region between the convex and concave portions of the loop may extend beyond the engagement section. In particular, it is also possible that the loop is concave substantially all the way between the first and second sprocket wheels on the side of the engagement section.

According to a further embodiment, each of the at least one power output assembly is in the form of an arm, with the power transmission chain being arranged along the respective arm. The arm extends from the remainder of the drive unit. In this way, the power transmission chain extends away from the remainder of the drive unit, such that a selective engagement between the power transmission chain and the sprocket element may be achieved without the remainder of the drive unit and the sprocket element of the wheel and/or the wheel itself interfering with each other in an undesired manner. The extension of the arm away from the remainder of the drive unit also creates an additional degree of freedom for placing the remainder of the drive unit, such that a particularly space-efficient arrangement may be provided.

According to a further embodiment, the arm is rotatable around a rotation axis fixed with respect to the remainder of the drive unit. In a particular embodiment, the rotation axis substantially corresponds to an axis of the first sprocket wheel. However, it is also possible that the rotation axis substantially corresponds to an axis of the second sprocket wheel.

According to a further embodiment, the arm is rotatable by means of a hydraulic or electric actuator.

According to a further embodiment, each of the at least one power output assembly comprises a pivoting cylinder for rotating the respective power output assembly. The pivoting cylinder allows for providing rotating capabilities, while having low space requirements, being capable of transferring large forces/torques in an aircraft running gear and being durable in the described operation scenarios. According to a particular embodiment, an axis of the pivoting cylinder substantially corresponds to a rotation axis of the respective power output assembly. It is further possible that the axis of the pivoting cylinder may substantially correspond to the axis of the first sprocket wheel. In this way, a compact design with particularly low space requirements for the engagement/disengagement mechanism as well as the power transmission at the output stage of the drive unit is achieved. In a particular embodiment, the pivoting cylinder is a hydraulic actuator.

According to a further embodiment, the power transmission chain is one of a roller chain, a sleeve type chain, and a Galle-chain.

According to a further embodiment, wherein each of the at least one power output assembly comprises a plurality of power transmission chains running in parallel or wherein each of the at least one power output assembly comprises a multi-row power transmission chain. The number of power transmission chains per power assembly or the number of rows per multi-row power transmission chain can be 2 or 3 or 4 or 5 or more. The term running in parallel means that respective two lateral sides of the power transmission chains, i.e. the sides that are not in an engagement with any sprocket component, are arranged adjacent each other. It can also be said that the plurality of power transmission chains are arranged next to each other. The term multi-row power transmission chain refers to a power transmission chain that has multiple rows of engagement portions arranged adjacent each other, with the lateral portions to the sides of these engagement portions serving as lateral portions for two adjacent engagement portions. In other words, a multi-row power transmission chain can be thought of an arrangement of multiple single-row power transmission chains next to each other, however, with only one lateral side portion being present between two rows, said lateral side portion supporting the engagement portions to both sides thereof. If multiple power transmission chains or a multi-row power transmission chain are/is present per power output assembly, such power output assembly also comprises an according plurality of first sprocket wheels and an according plurality of second sprocket wheels, with each of the multiple power transmission chains/each of the rows of the multi-row power transmission chain running over a respective one of the first sprocket wheels and a respective one of the second sprocket wheels. Also, the plurality of power transmission chains/the multiple rows of the multi-row power transmission chain are selectively engageable with an according plurality of sprocket elements coupled to the respective wheel. Each power transmission chain/each row of the multi-row power transmission chain is selectively engageable with one of the plurality of sprocket elements. By providing such a plurality of power transmission subsystems per power output assembly, with each power transmission subsystem comprising one power transmission chain/one row of the multi-row transmission chain, one first sprocket wheel, one second sprocket wheel and one sprocket element coupled to one of the wheels of the aircraft running gear, the required power transmission capacity is split up between a plurality of subsystems, such that each subsystem may be designed for a lower power transmission capacity, making the design and production less complex and less expensive. Alternatively, redundancy can be introduced in this way, ensuring safe operation even in the case of a failure of one of the subsystems. It is explicitly pointed out that all embodiments described herein can also be realized with each power output assembly comprising exactly one single-row power transmission chain.

According to a further embodiment, a direction of longitudinal extension of the drive unit is in a plane orthogonal to the common wheel axis. In this way, the motor(s) of the drive unit is/are no longer confined to the distance between the two wheels in its/their longitudinal direction. Without such a strict limit on the longitudinal extension of the motor(s), the speed and/or torque and/or speed torque product achieved by the motor(s) can be increased as compared to the prior art. Accordingly, more power for taxiing the aircraft can be generated by the motor(s). It is pointed out that the direction of longitudinal extension of the drive unit refers to the axis of the motor shaft of the motor comprised in the drive unit, which is also referred to as the longitudinal extension of the motor. Accordingly, the orientation of the motor allows for a more flexible length of the motor, such that improved motor characteristics can be realized. The particular orientation of the drive unit also allows for the distance between the first and the second wheel to be chosen more flexibly. With the power output assemblies comprising power transmission chains, the distance between the first and second wheel may even be reduced to the space required for moving only the two power transmission chains into said intermediate space. A decreased distance between the first and second wheel may result in the overall space requirements for the wheel arrangement to be decreased, such that the whole aircraft running gear may be stowed in a more space-efficient manner during the flight. Commonly, the direction of longitudinal extension of the drive unit corresponds to the direction of the largest geometric extension of the drive unit. The term common wheel axis refers to the geometrical axis running through the centers of the first and second wheels.

The plane orthogonal to the common wheel axis may be situated between the first and second wheel. In this way, the space between the first and second wheels may be used much more efficiently than in the prior art. The drive unit may be positioned substantially parallel to the running gear leg supporting the first and second wheels, e.g. in front of the running gear leg. Accordingly, a large portion of the drive unit lies within the space between the two wheels. The space between the two wheels refers to the total room enclosed by the projection of the circumference of the first wheel onto the circumference of the second wheel. This space is largely unused in prior art arrangements, but has to be accounted for when stowing the wheel arrangement during the flight. Accordingly, the invention allows for providing a more powerful, possibly larger motor than the prior art, while decreasing the space requirements through making it possible to reduce the distance between the wheels and to use the remaining space between the wheels efficiently.

It is, however, explicitly pointed out that the direction of longitudinal extension of the drive unit is not required to be in a plane orthogonal to the common wheel axis. In particular, the direction of longitudinal extension of the drive unit may also be in parallel with the common wheel axis. In such a case, it is possible that the respective first sprocket wheels of the two power output assemblies are arranged at opposite sides of the drive unit.

According to another embodiment, the first sprocket wheel of the first power output assembly and the first sprocket wheel of the second power output assembly are aligned on a common output stage axis, which is substantially orthogonal to the direction of longitudinal extension of the drive unit. The common output stage axis may be parallel to the common wheel axis. Such orientation allows for a convenient selective engagement between the drive unit and the wheel structure. The combination of the two first sprocket wheels and the two sprocket elements of the first and second wheels also allows for establishing a gear ratio stage that is outside the drive unit. As the first sprocket wheels may have a small diameter and the sprocket elements may have a large diameter, a reduction gear stage having large transmission ratio can be achieved, which helps to produce sufficient torque using a compact motor. Accordingly, this gear ratio stage is in addition to all gear ratios that may be implemented within the drive unit, which helps in keeping the drive unit compact.

According to a further embodiment, the drive unit comprises a first motor drivingly coupleable to the first wheel via a first gear structure and the first power output assembly and a second motor drivingly coupleable to the second wheel via a second gear structure and the second power assembly, wherein the first and second motors are arranged in tandem along the direction of longitudinal extension of the drive unit. The arrangement in tandem refers to a one-behind-the-other arrangement in the direction of longitudinal extension of the drive unit. Providing a respective motor for driving each of the two wheels allows for the drive unit to be capable of driving the first and second wheels independently and to provide a desired wheel speed difference when the aircraft is turning a corner. For example, the running gear leg may be turned by a steering motor in order for the aircraft to steer to the right or to the left. The steering signal provided to the steering motor may also be provided to the first and second motors, such that these motors can drive the first and second wheel in accordance with the desired turning radius. Accordingly, a turning of the airplane is made possible that reduces the wear and tear of the tires and other components of the wheel arrangement. It is also possible to cause the turning of the aircraft by driving the first and second wheels at different speeds. The arrangement of the first and second motors in tandem allows for a space efficient positioning of the two motors, with the provision of two motors only adding to the longitudinal extension of the drive unit, but not to the lateral extension. Therefore, the provision of two motors does not have an impact on the distance between the first and second wheels required to accommodate the drive unit. Consequently, an improved driving of the first and second wheels is achieved, while ensuring a space-efficient arrangement of the whole aircraft running gear. Again, it is pointed out that this tandem arrangement may be realized independently from the orientation of the longitudinal extension of the drive unit.

In the case of exactly one power output assembly being provided for driving exactly one wheel, the two wheels, which are provided on the same geometrical axis, may be mechanically separated in such a way that their wheel speeds can differ. In this way, the turning of the aircraft can also be achieved in a manner that reduces wear and tear of the tires and other components. In other words, the wheel that is not driven by the one power output assembly, is a passive element and adjusts its wheel speed according to the operating conditions.

According to a further embodiment, the first motor in operation drives a first bevel gear, with the first bevel gear being drivingly coupleable to the first wheel via the first gear structure and the first power output assembly, and the second motor in operation drives a second bevel gear, with the second bevel gear being drivingly coupleable to the second wheel via the second gear structure and the second power output assembly. The first and second bevel gears allow for a change of the direction of the rotation axis of the components driven by the first and second motors. Particularly, the rotation of the shafts of the first and second motors can cause the rotation of other gear elements that are not aligned or parallel with the motor shafts and are comprised in the first and second gear structures, respectively. More particularly, a turning of the rotation axis of the driven components of 900 can be achieved. Accordingly, gear structure components whose rotation axis is identical with or parallel to the common wheel axis can be driven via the first and second bevel gears. This rotation can then be transmitted to the first and second wheels in a convenient manner. The turning of the rotation axis of the driven components may also be achieved by a combination of a face gear and a spur gear. Such an arrangement may be alternatively provided in all places where this application describes the usage of bevel gears.

According to a further embodiment, the first and second motors are arranged in a coaxial manner. This arrangement allows for a highly efficient use of space, as only one common axis of rotation is present in the drive unit, around which the first and second motors are arranged. The lateral extension of the drive unit can be kept to a minimum, because no two laterally offset motor shafts are required for driving the wheels.

According to a further embodiment, the first motor has a first motor shaft and the second motor has a second motor shaft, with the first motor shaft being hollow and being arranged around the second motor shaft. The arrangement of one hollow motor shaft around the other motor shaft ensures that the first and second motors can be arranged in a coaxial manner, while complete independence of the driving of the first and second wheels is achieved.

In a particular embodiment, the first and second motors are electric motors or hydraulic motors.

In a further embodiment, the first gear structure comprises a first gear element, having a third bevel gear and a first gear element shaft, and the second gear structure comprises a second gear element, having a fourth bevel gear and a second gear element shaft, with one of the first and second gear element shafts having a hollow portion and the other one of the first and second gear element shafts being supported in the hollow portion. The rotation axes of the first and second gear element shafts may be aligned. The supporting of one gear element shaft within the other allows for a highly compact and stable arrangement of the two independent power transmissions from the first motor to the first wheel and from the second motor to the second wheel. The first bevel gear may be in engagement with the third bevel gear, and the second bevel gear may be in engagement with the fourth bevel gear. In this way, a first gear ratio stage is realized. The gear ratio between the first and third bevel gears may be the same as the gear ratio between the second and fourth bevel gears. The power generated by the first and second motors is transmitted via two coaxial motor shafts to two gear elements, which are aligned on a common axis, but are laterally displaced with respect to each other. A compact power transmission is achieved that provides—at its output—two laterally displaced gear elements with independent speeds of rotation. With one gear element supported within the other, the lateral dimension of the drive unit is kept to a minimum.

According to another embodiment, the drive unit comprises a motor and a differential gear, with the motor being drivingly coupleable to the first and second wheels via the differential gear and the first and second power output assemblies. The provision of the differential gear allows for a mechanical adjustment of the wheel speeds when the aircraft is turning a corner. Accordingly, the two wheels can be driven with one motor, while the differential gear ensures the reduction of wear and tear on the tires and other wheel structure components by mechanically adjusting the wheel speeds to a given turning radius. The differential gear may be an integrated differential gear, meaning that it is integrated into a gearbox. The motor may comprise a bevel gear for engaging with the differential gear. In this way, an efficient rotation of the power transmission axis from the direction of longitudinal extension of the drive unit to a direction parallel or coaxial with the common wheel axis is achieved. The differential gear may be coupleable to the first and second wheels by first and second gear structures and the first and second power output assemblies, respectively. Also, the differential gear may be a bevel differential or planetary differential or ball differential or face gear differential. The motor may be an electric motor or a hydraulic motor.

In a further embodiment, the first and second gear structures comprise a planetary gear, respectively. The planetary gears allow for a reduction of the rotation speeds and an according increase of the torques in a very compact manner. With little space required, a gear ratio stage can be implemented in the drive unit via the planetary gears. Together with the gear ratio stage associated with the bevel gears and the gear ratio stage associated with the power output assemblies and the sprocket elements of the wheels, three reduction stages may be realized in a very compact manner. The bevel gear stage allows for a 90° change of the rotation axis from the direction of the motor shaft(s) to a direction aligned with or parallel to the common wheel axis. In case such a 90° change of the rotation axis is not required due to the orientation of the drive unit, the bevel gear stage may be replaced by another suitable gear stage. The reduction stage at the drive unit output allows for a convenient implementation of a simultaneous engagement of the two power transmission chains of the drive unit with the sprocket elements coupled to the first and second wheels, respectively.

In a further embodiment, the drive unit comprises a mounting structure for being mounted to the aircraft running gear and the entire drive unit with the exception of the mounting structure is movable with respect thereto such that the power transmission chain is selectively engageable with the sprocket element. In other words, an engagement of the power transmission chain with the sprocket element is achieved by moving the entire drive unit with respect to its mounting structure. In a particular embodiment, the drive unit with the exception of the mounting structure is pivotally rotatable and/or laterally displaceable with respect to the mounting structure. In a further particular embodiment, the drive unit with the exception of the mounting structure is movable by means of an electric or hydraulic actuator.

The drive unit may also comprise an integrated free-wheel arrangement. A freewheel arrangement prevents a rotation of the wheels to be transmitted to the motor(s) of the drive unit, even when the drive unit is in an engaged position. Accordingly, at one point in the power transmission path from the motor(s) to the power output assemblies, a stage may be equipped with an overrunning clutch or the like that prevents power transmission from a downstream element to an upstream element, when looking at the normal operational power flow from the motor(s) to the wheels. Such a free-wheel arrangement allows the airplane to keep on rolling, should the motor(s) of the drive unit fail. The failed motor(s) cannot block the rotation of the wheels. Also, for the process of engaging the drive unit with the sprocket elements coupled to the first and second wheels, the free-wheel arrangement ensures a synchronization of the sprocket element speeds with the power transmission chain speeds, such that severe damage to the drive unit due to an un-synchronized engagement attempt can be prevented during the engaging operation. The free-wheel arrangement may be incorporated into any rotatably fixed coupling present in the gear arrangement described. For example, the coupling of the two first sprocket wheels with respect to the first and second gear structures may have an integrated free-wheel arrangement. Alternatively, first and second ring gears of the first and second planetary gears may have an integrated free-wheel arrangement. The free-wheel arrangement may be realized mechanically. The free-wheeling direction of the free-wheel arrangement may be reversible. This allows for the advantages of the free-wheeling arrangement to be present both when driving the aircraft forward and backwards with the drive unit.

In a further embodiment, the drive unit comprises a self-securing engagement/disengagement mechanism. Such a self-securing engagement/disengagement mechanism prevents an inadvertent engagement of the drive unit with the wheel structure, which could result in unexpected behavior of the aircraft landing gear, which is potentially highly dangerous, especially during take-off and landing. The self-securing engagement/disengagement mechanism may be operated in a pneumatic, hydraulic or electric manner.

In a further embodiment, the drive unit comprises an engagement/disengagement mechanism adapted to synchronize the rotating speed of the power transmission chain of each of the at least one power output assembly with the respective sprocket element by sensing the wheel speed and adjusting the motor speed. Accordingly, a synchronized angular velocity of the power transmission chains and the sprocket elements can be reached at the engagement section of the power transmission chains, which allows for a precise engaging of these components, such that the wear and tear of the components can be kept low. The drive unit may comprise a control unit, which is in communication with a sensor measuring the wheel speed and generates control commands for the motor of the drive unit. In the case of two independent motors being provided for driving the first and second wheels, two sensors may be provided for measuring the wheel speeds and two control commands may be generated by the control unit to control the two motors independently.

In another embodiment, the drive unit may comprise a sensing device for sensing the relative positioning of sprocket teeth for targeted engaging of the power transmission chain of each of the at least one power output assembly with the respective sprocket element. Using a direct measuring of the positions of sprocket teeth allows for a highly accurate engaging of the components, as the variable that is decisive for the wear and tear of the components, namely their relative positioning, is directly available for the control of the motor(s) of the drive unit. The position of the elements of the power transmission chains may be determined via a separate sensor, such as an incremental encoder, a resolver, or another positional sensor at the location of the power transmission chain. In case the motor is an electric motor, it commonly comprises a positional sensor for determining the position of the motor, whose output may be used for determining the position of the power transmission chain, with the determination taking the gearbox gear ratio into account. The position of the sprocket element may also be determined by a positional sensor that may be integrated into the running gear leg. The aircraft running gear may comprise an ABS braking system, in which case an output of a positional sensor of the ABS braking system may be used for determining the position of the sprocket element. The positional sensor for determining the position of the sprocket element may be mounted to the drive unit. The positional sensor may be an optical or inductive sensor measuring the distance to a tooth of the sprocket element or being triggered by the teeth of the sprocket element. The location of spaces between teeth can be determined very accurately in this way.

According to another embodiment, an aircraft running gear comprises at least a first wheel and a second wheel on a common wheel axis and a drive unit as described in any of the embodiments above. The aircraft running gear may comprise a first sprocket element, which is coupled to the first wheel, engageable to the power transmission chain of the first power output assembly of the drive unit, and a second sprocket element, which is coupled to the second wheel, engageable to the power transmission chain of the second power output assembly of the drive unit.

The aircraft running gear may also have a running gear leg supporting the first and second wheels, with the drive unit being mounted to the running gear leg, in particular via a mounting structure. The wheels may be supported by the running gear leg via a wheel shaft assembly. The attachment to the running gear leg allows for a stable attachment of the drive unit to the aircraft running gear. The direction of longitudinal extension of the drive unit may be substantially parallel to the running gear leg. This arrangement allows for using the space between the first and second wheels for the positioning of the drive unit, such that an overall space-efficient aircraft running gear is formed. Particularly, the stowing space for the aircraft running gear during the flight is kept low. Also, the positioning of the drive unit in parallel to the running gear leg ensures that only minimal additional aerodynamic resistance is introduced by the drive unit.

In a further embodiment, the aircraft running gear is adapted to be used as a nose running gear or a main running gear. Also, the first and second sprocket elements may be mounted on a respective rim of the first and second wheels. The first and second rims are very suitable structures for mounting the first and second wheel axis gears, as they are inherently stable structures that are adapted to carry the weight of the whole aircraft and that are designed to withstand extreme environmental conditions, during the flight as well as on the ground. The first and second sprocket elements and/or the respective rims may be made of light metal, such as aluminum or titanium.

The properties and features described with respect to an aircraft running gear having a drive unit with two power output assemblies drivingly coupleable to the first and second wheels are analogously applicable to an aircraft running gear having a drive unit with exactly one power output assembly drivingly coupleable to exactly one wheel.

BRIEF DESCRIPTION OF THE DRAWINGS

The invention is described in more detail below with regard to the exemplary embodiments shown in the accompanying Figures, in which:

FIG. 4 shows a further cross-sectional view through the aircraft running gear according to the first exemplary embodiment of the invention.

FIG. 6 shows a cross-sectional view through an aircraft running gear according to a second exemplary embodiment of the invention.

FIGS. 7a and 7b show a three-dimensional representation of an aircraft running gear according to a third exemplary embodiment of the invention, with FIG. 7a showing a power transmission chain in a disengaged position and FIG. 7b showing the power transmission chain in an engaged position.

FIGS. 8a and 8b show two cross-sectional views through the aircraft running gear according to the third exemplary embodiment of the invention, the two cross-sectional views corresponding to the two three-dimensional representations of FIGS. 7a and 7b.

DETAILED DESCRIPTION OF THE PREFERRED EMBODIMENTS

Figure 1:
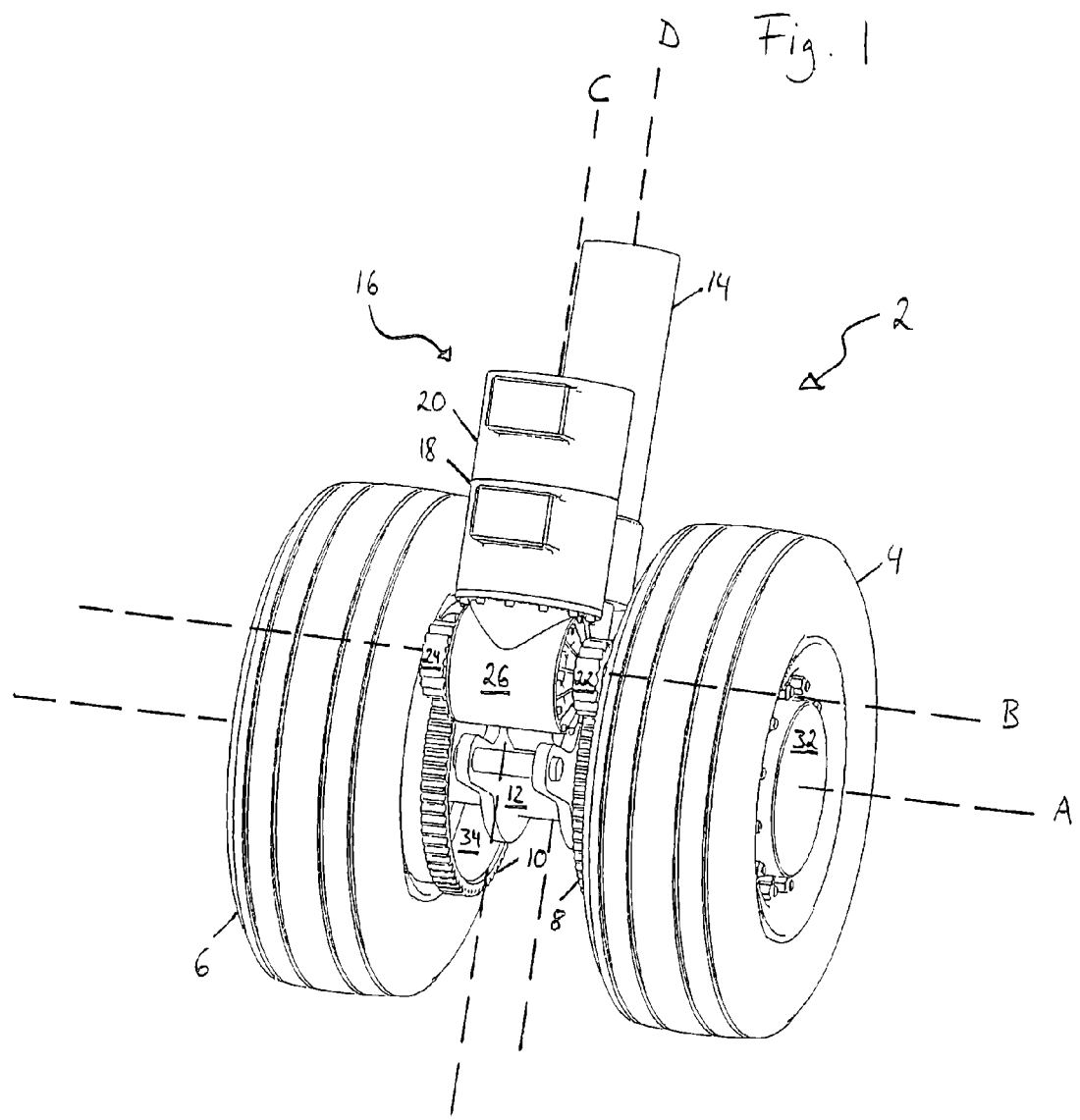
FIG. 1 shows a three-dimensional representation of an aircraft running gear according to a first exemplary embodiment of the invention.

FIG. 1 shows a three-dimensional representation of an aircraft running gear 2 according to a first exemplary embodiment of the present invention. The aircraft running gear 2 comprises a first wheel 4 and a second wheel 6, which are connected by a shaft assembly 12. The first and second wheels 4, 6 are aligned on a common wheel axis A in the geometrical sense. The first wheel 4 comprises a first rim 32, which is provided with a first wheel axis gear 8. The second wheel 6 comprises a second rim 34, which is provided with a second wheel axis gear 10. The first and second wheel axis gears 8, 10 can be mounted onto the first and second rims 32, 34 of the first and second wheels 4, 6 in any suitable manner that allows for a rotatably fixed attachment between the rims and the wheel axis gears. The rims and the wheel axis gears may also be made of one piece, respectively, i.e. the first rim 32 and the first wheel axis gear 8 may be made of one piece and the second rim 34 and the second wheel axis gear 10 may be made of one piece. In these ways, a fixed coupling between the first and second wheel axis gears 8, 10 and the first and second wheels 4, 6 is achieved, such that the rotational motion transmitted to the first and the second wheel axis gears 8, 10 is transmitted to the first and second wheels 4, 6. The first and second wheel axis gears 8, 10 are circular external gears, with their teeth being arranged straight between and perpendicular to the axial edges of the external gear.

The aircraft running gear 2 further comprises a running gear leg 14 running along a leg axis D and a drive unit 16, which is attached to the running gear leg 14. The drive unit 16 comprises a first motor 18 and a second motor 20, a gearbox 26, a first output stage gear 22 and a second output stage gear 24. The first and second motors 18, 20 are arranged along a common longitudinal axis C, also referred to as the direction of longitudinal extension of the drive unit 16. The first and second output stage gears 22, 24 are arranged along a common output stage axis B. The drive unit 16 is moveably mounted to the running gear leg 14, so that the first and second output stage gears 22, 24 can be selectively brought into engagement with the first and second wheel axis gears 8, 10. An engagement operation brings the first and second output stage gears 22, 24 simultaneously into engagement with the first and second wheel axis gears 8, 10. The first motor 18 is drivably coupled to the first output stage gear 22, and the second motor 20 is drivably coupled to the second output stage gear 24. In this way, the first and second wheels 4, 6 can be driven with different speeds by the first and second motor 18, 20, such that an aircraft that is equipped with the aircraft running gear 2 can easily turn corners in the airfield or maneuvering area of an airport. The gearbox 26 provides a gearbox gear ratio. Also, the output stage gears 22, 24 and the wheel axis gears 8, 10 provide an output gear ratio. The product of the gearbox gear ratio and the output stage gear ratio allows for a driving of large planes with two comparably very small motors that can be placed in front of the running gear leg 14 and extend into the space between the first and second wheels 4, 6. The gear ratios transform the high motor speeds of the first and second motors 18, 20 into large amounts of torque required for driving the aircraft during a taxiing operation.

In the exemplary embodiment shown in FIG. 1, the first and second motors 18, 20 are electric motors. However, the drive unit 16 can also be equipped with hydraulic motors.

Figure 2:
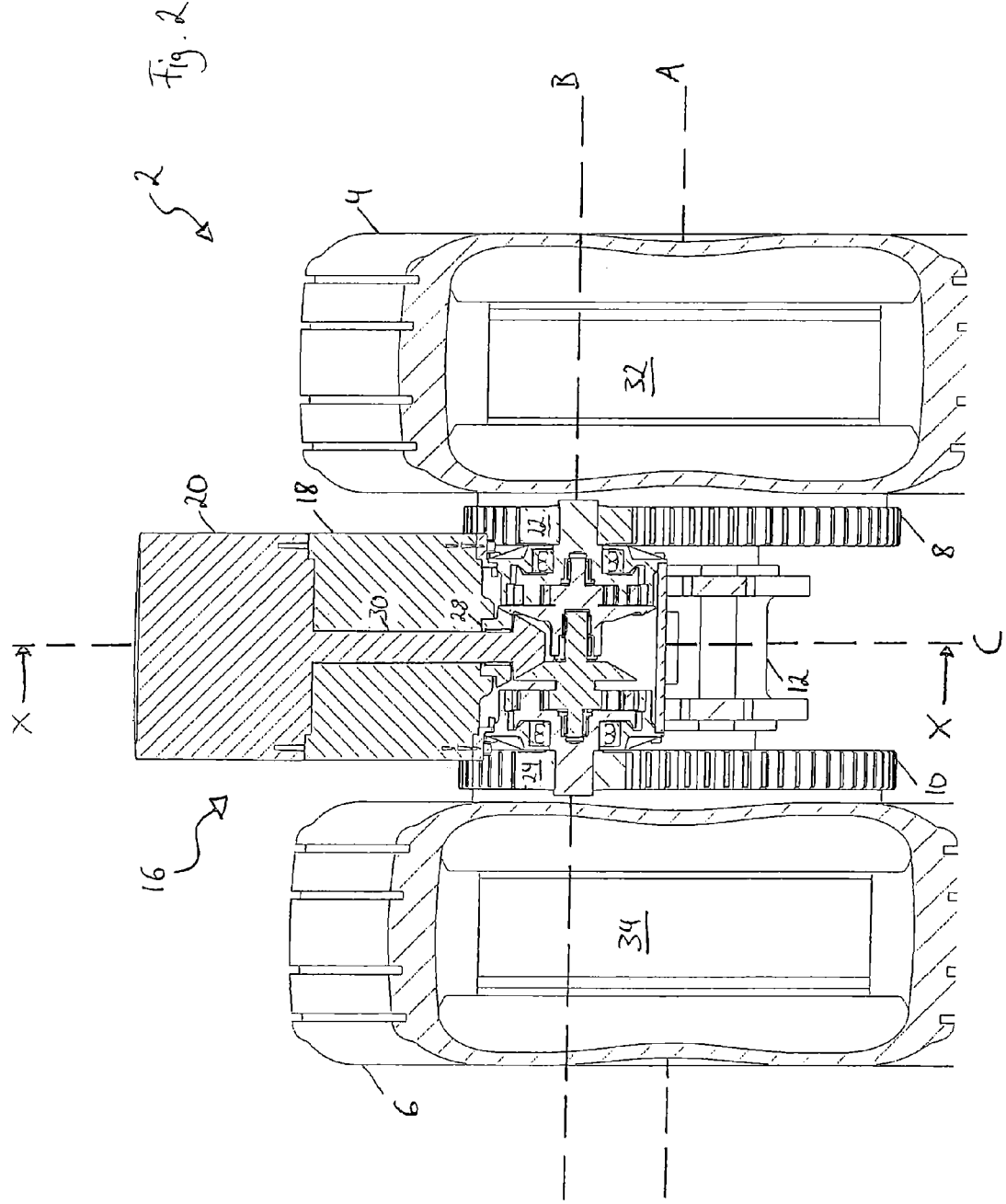
FIG. 2 shows a cross-sectional view through the aircraft running gear according to the first exemplary embodiment of the invention.

FIG. 2 is a cross-sectional view of the aircraft running gear 2 of FIG. 1. The cross-sectional plane is parallel to the wheel axis in front of the running gear leg 14. The output stage axis, on which the first and second output stage gears 22, 24 are aligned, lies within the cross-sectional plane, such that the drive unit 16 is cut in half along the longitudinal extension of the drive unit by the cross-sectional plane, i.e. the cross-section of FIG. 2 shows the interior of the drive unit 16. As the aircraft running gear 2 of FIG. 2 corresponds to the aircraft running gear of FIG. 1, like reference numerals are used for like elements. FIG. 2 illustrates well that the first and second wheel axis gears 8, 10 are mounted onto the first and second rims 32, 34.

The second motor 20 comprises a second motor shaft 30 that extends through the first motor 18. The first motor 18 comprises a first motor shaft 28 that is hollow and is arranged around the second motor shaft 30. In the exemplary embodiment shown in FIG. 2, the first motor shaft 28 extends along a small portion of the second motor shaft 30. The first and second motor 18, 20 are arranged in a coaxial manner, i.e. the center axes of the first motor shaft 28 and the second motor shaft 30 are identical and identical to the axis C defining the longitudinal extension of the first and second motors. Again, the term axis is used in its geometrical meaning.

The first motor 18 and the second motor 20 are arranged in tandem, i.e. they are arranged in a one behind the other relationship as seen from the gearbox or in a one above the other relationship as seen in the cross-sectional plane of FIG. 2. This viewing direction roughly corresponds to an observer's viewing direction when positioned in front of the aircraft running gear 2 of an aircraft. The coaxial arrangement of the first and second motors 18, 20 allows for the provision of two motors that are co-extensive along the longitudinal extension of the drive unit 16. In other words, the two motors extend substantially equally from their common axis in all directions orthogonal to the common axis, in particular in the lateral direction being defined as the direction of the common wheel axis.

Figure 3:
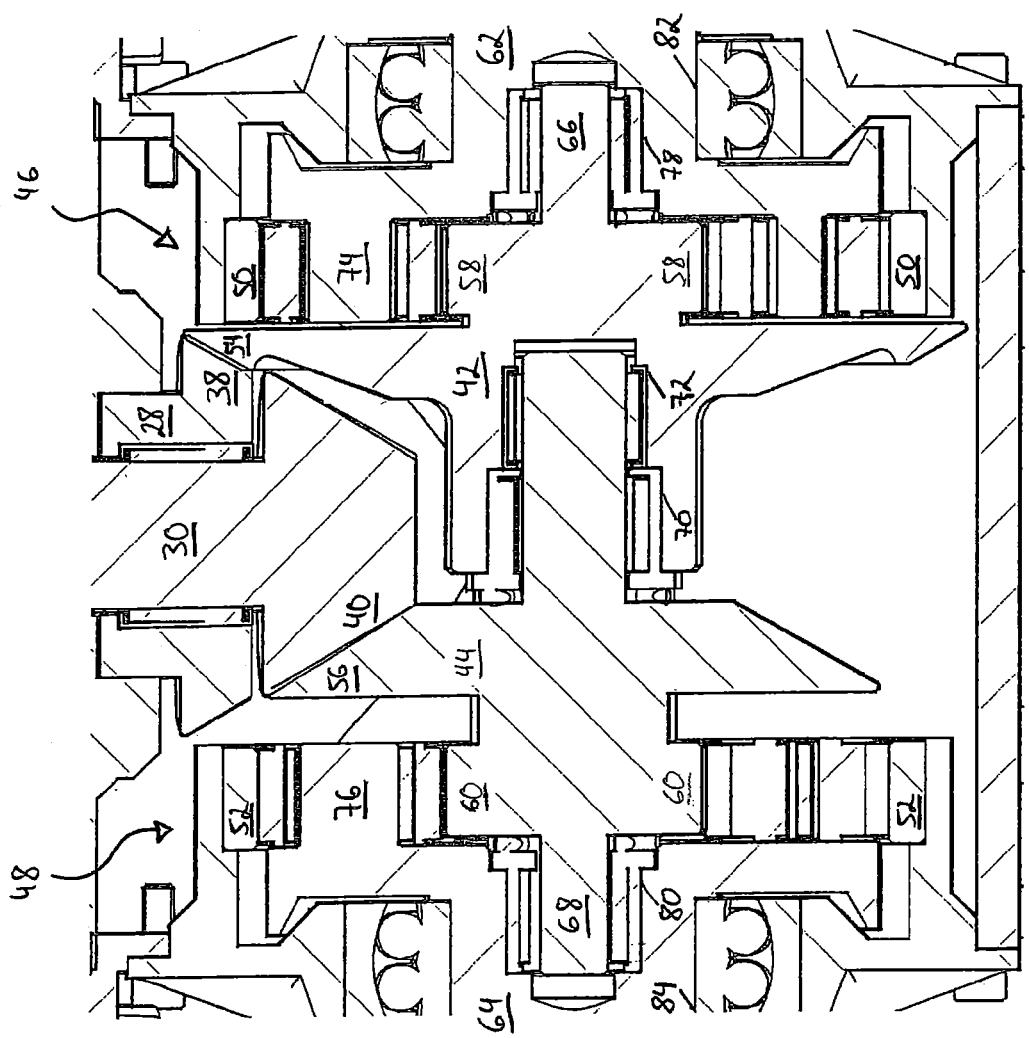
FIG. 3 shows an enlarged portion of the cross-sectional view shown in FIG. 2.

FIG. 3 is an enlarged version of the gearbox portion shown in the center of FIG. 2. FIG. 3 shows the first motor shaft 28 of the first motor 18 as well as the end portion of the second motor shaft 30 of the second motor 20. The first motor shaft 28 comprises a first bevel gear 38 at its end portion. The second motor shaft 30 comprises a second bevel gear 40 at its end portion. The gearbox 26 further comprises a first gear element 42 and a second gear element 44. The first gear element 42 comprises a third bevel gear 54, which is in engagement with the first bevel gear 38. The second gear element 44 comprises a fourth bevel gear 56, which is in engagement with the second bevel gear 40. The first gear element 42 further comprises a first gear element shaft 66, and the second gear element 44 comprises a second gear element shaft 68. The first gear element shaft 66 and the second gear element shaft 68 are aligned along a common axis. In the exemplary embodiment of FIG. 3, this axis of the first and second gear element shafts 66, 68 coincides with the output stage axis, on which the first and second output stage gears 22, 24 are aligned. The first and second gear element shafts respectively extend from a center portion of the gearbox 26 towards the first and second output stage gears 22, 24 arranged on the lateral ends of the gearbox 26, which can be best seen in FIG. 2. Through the first to fourth bevel gears, the rotation of the first and second motor shafts 28, 30 causes the rotation of the first and second gear elements 42, 44. In this manner, the rotation axis of the first and second gear elements 42, 44 is orthogonal to the rotation axis of the first and second motor shafts 28, 30. It is pointed out that the arrangement of the first and third bevel gears 38, 54 as well as the arrangements of the second and fourth bevel gears 40, 56 could be replaced by respective arrangements of a face gear and a spur gear.

The portion of the first gear element shaft 66 towards the center portion of the gearbox 26 is hollow. The portion of the second gear element shaft 68 towards the center portion of the gearbox 26 is supported within the first gear element shaft 66. This supporting of the second gear element shaft 68 within the first gear element shaft 66 allows for an accurate and stable alignment of the first and second gear element shafts 66, 68 and also of the first and second gear elements 42, 44 as a whole. The second gear element shaft 68 is supported within the first gear element shaft 66 by a first combined axial and radial bearing 70 and a radial bearing 72.

The gearbox 26 further comprises a first planetary gear 46 and a second planetary gear 48. It also comprises a third gear element 62 and a fourth gear element 64. The first planetary gear 46 couples the first gear element 42 to the third gear element 62, and the second planetary gear 48 couples the second gear element 44 to the fourth gear element 64.

The gearbox 26 comprises a first internal gear 50, which serves as the ring gear for the first planetary gear 46. The first gear element 42 comprises a first external gear portion 58, which serves as the sun gear of the first planetary gear 46. The third gear element 62 comprises a first plurality of planet gears 74. The first plurality of planet gears 74 are in engagement with the first internal gear 50 and the first external gear portion 58. In this way, the first external gear portion 58, the first plurality of planet gears 74 and the first internal gear 50 form the first planetary gear 46.

The gearbox 26 further comprises a second internal gear 52, which serves as the ring gear for the second planetary gear 48. The second gear element 44 comprises a second external gear portion 60, which serves as the sun gear of the second planetary gear 48. The fourth gear element 64 comprises a second plurality of planet gears 76. The second plurality of planet gears 76 are in engagement with the second internal gear 52 and the second external gear portion 60. In this way, the second external gear portion 60, the second plurality of planet gears 76 and the second internal gear 52 form the second planetary gear 48.

The outer portion of the first gear element shaft 66, i.e. the portion of the first gear element shaft 66 towards the first output stage gear 22, is supported within a recess of the third gear element 62 via a second combined axial and radial bearing 78. In this way, a stable alignment between the first gear element 42 and the third gear element 62 is achieved, which allows for a reliable functioning of the first planetary gear 46. The outer portion of the second gear element shaft 68, i.e. the portion of the second gear element shaft 68 towards the second output stage gear 24, is supported within a recess of the fourth gear element 64 via a third combined axial and radial bearing 80. In this way, a stable alignment between the second gear element 44 and the fourth gear element 64 is achieved, which allows for a reliable functioning of the second planetary gear 48.

The third gear element 62 is supported against the housing of the gearbox 26 via a fourth combined axial and radial bearing 82. Equally, the fourth gear element 64 is supported against the housing of the gearbox 26 via a fifth combined axial and radial bearing 84. The first output stage gear 22 is mounted to the third gear element 62, and the second output stage gear 24 is mounted to the fourth gear element 64. This mounting can be done in any suitable way that allows for a rotatably fixed connection between the third and fourth gear elements 62 and 64 and the first and second output stage gears 22, 24.

By supporting the first and second gear elements 42, 44 with respect to each other and by supporting the third and fourth gear elements 62, 62 with respect to the first and second gear elements 42, 44 and with respect to the housing of the gearbox 26, an alignment of the first through fourth gear elements 42, 44, 62, 64 is realized, which allows for a compact and stable gear structure for transmission of the rotational energy from the first and second motor shafts 28, 30 to the first and second output stage gears 22, 24. The described gear structure also allows for an independent drivable coupling of the first motor shaft 28 to the first output stage gear 22 and the second motor shaft 30 to the second output stage gear 24 in an extremely compact manner. This allows for placing the drive unit 16 in the highly space-critical environment of an aircraft running gear.

With regard to FIGS. 2 and 3, the overall gear ratio that is achieved by the exemplary gear structure is discussed. The described system comprises three reduction stages. The first reduction stage takes place between the first and second bevel gears 38, 40 and the third and fourth bevel gears 54, 56, respectively. The second reduction stage is realized by the first and second planetary gears 46, 48, respectively. The third reduction stage takes place between the first and second output stage gears 22, 24 and the first and second wheel axis gears 8, 10, respectively. The first and second reduction stages are embedded into the gearbox 26, whereas the third reduction stage is realized outside the gearbox through the engagement of the gearbox output stage with the gears associated with the first and second wheels 4, 6.

The selective driving of the first and second wheels 4, 6 by the drive unit 16 is achieved by selective engagement between the drive unit and the first and second wheel axis gears 8, 10. A mechanism of selective engagement is referred to as a mechanism that allows for engagement and disengagement of two elements, particularly of two gears. The point of engagement/disengagement, i.e. the point of selective engagement, lies behind the gearbox 26 in terms of the transmission direction of rotational energy. In other words, the first and second motor shafts 28, 30 are always in engagement with the gear arrangement within the gearbox 26, i.e. with the gear arrangement of the first and second reduction stages. The selective driving between the drive unit 16 and the first and second wheels 4, 6 is achieved via selective engagement on the output side of the drive unit.

In the exemplary embodiment described, the first reduction stage has a gear ratio of between 1.5 and 2.5. The second reduction stage has a gear ratio of between 3 and 4. The third reduction stage has a gear ratio of between 3.5 and 4.5. In this way, it is possible to drive an aircraft with a maximum takeoff weight between 70,000 kg and 80,000 kg needing a torque of between 10,000 and 18,000 Nm at the nose wheel for taxiing by a single drive unit having a maximum torque of between 500 Nm and 600 Nm and a maximum speed of between 6,000 and 8,000 revolutions/min. It is explicitly stated that these numbers are of illustrative nature and are a mere example of the overall design of the drive unit and the aircraft running gear.

The drive unit allows for taxiing an aircraft without the help of the main turbines. These are used for starting, landing and flying the aircraft and can be switched off during the maneuvering on the airfield in the presence of the drive unit described above. The power for operating the drive unit may be provided by an auxiliary power unit commonly present in modern aircrafts. The auxiliary power unit is a gas turbine engine smaller than the main turbines. It is commonly run before takeoff for supplying the airplane with electrical energy, for example for operating the cabin air conditioning, the passenger entertainment systems and other airplane appliances. The auxiliary power unit can be adapted to provide electrical energy and/or hydraulic pressure for a hydraulic motor. Alternatively, there can be a separate power source for the drive unit, for example a fuel cell or a rechargeable battery.

FIG. 4 is a further cross-sectional view of the aircraft running gear 2 depicted in FIGS. 1 and 2. The cross-sectional plane is orthogonal to the wheel axis and cuts the wheel axis and the running gear leg at substantially their center portions. The cross-sectional plane of FIG. 4 is marked in FIG. 2, with the viewing direction indicated by arrows x-x. FIG. 4 shows that the direction of longitudinal extension of the drive unit lies within a plane orthogonal to the common wheel axis A.

FIG. 4 shows the drive unit 16 in an engaged position with the first and second wheel axis gears 8, 10. More particularly, the first and second output stage gears 22, 24 are in engagement with the first and second wheel axis gears 8, 10, such that the first and second motors 18, 20 are driveably coupled to the first and second wheels 4, 6, respectively. The longitudinal extension of the drive unit 16 is substantially parallel to the running gear leg 14 in the engaged position.

The mounting of the drive unit 16 to the running gear leg 14 is described in more detail. The drive unit 16 comprises a mounting arm 88. The running gear leg 14 comprises a supporting portion 86 for mounting the drive unit 16. The supporting portion 86 and the mounting arm 88 are connected in a manner that allows for a rotation of the drive unit 16 with regard to the running gear leg 14. In other words, a pivot connection is established between the supporting portion 86 and the mounting arm 88. In the exemplary embodiment of FIG. 4, the mounting arm 88 is provided with a hole for receiving a mounting bolt, screw, rod, or the like. The supporting portion 86 has a recess for receiving the mounting arm 88 of the drive unit, with a plate being provided at each outer side of the recess of the supporting portion, one of which being shown in the cross-sectional view of FIG. 4. The two plates of the supporting portion 86 comprise a hole, which is aligned with the hole provided in the mounting arm 88, such that the bolt, screw, rod, or the like mentioned above, is positioned in a way extending through the hole provided in the mounting arm 88 and the holes provided in the supporting portion 86. In this way, the supporting portion 86 and the mounting arm 88 are connected, with the center axis of the bolt, screw, rod, or the like being the pivoting axis for the rotation of the drive unit 16 with respect to the running gear leg 14.

Figure 5B:
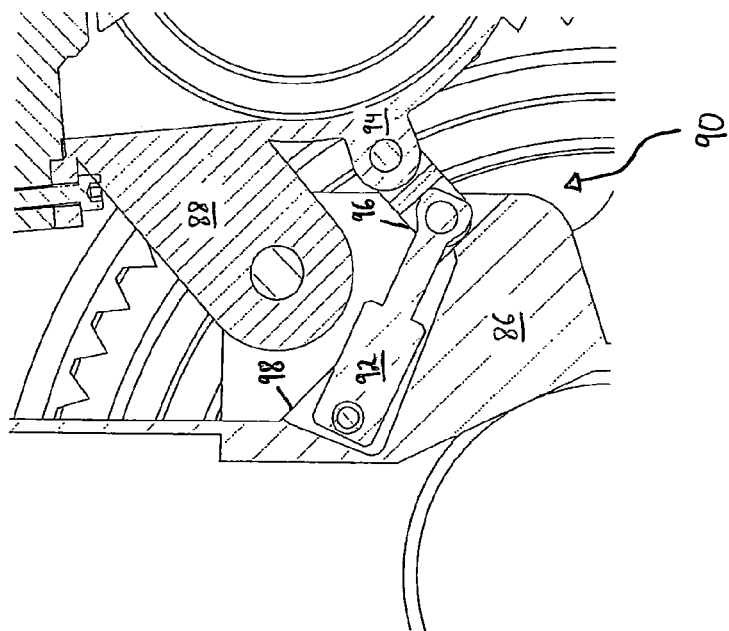
FIG. 5b shows the enlarged portion shown in FIG. 5a, with the drive unit being in a disengaged position.
Figure 5A:
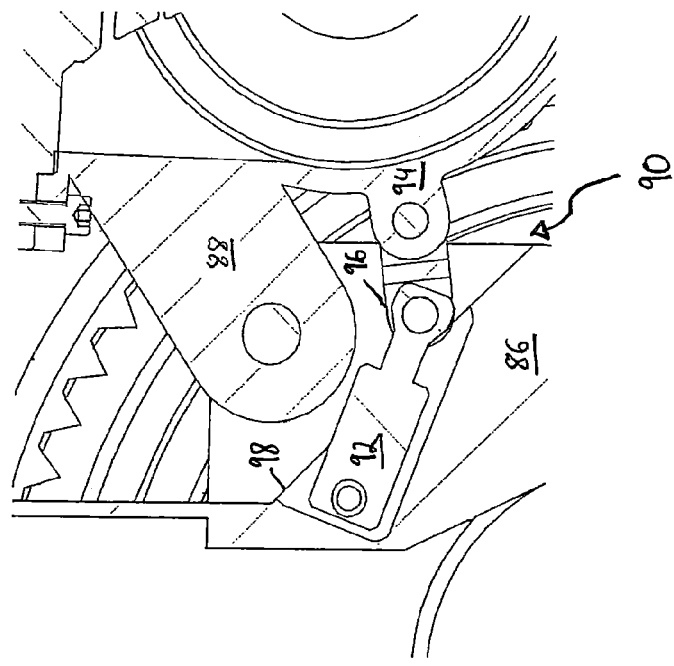
FIG. 5a shows an enlarged portion of the cross-sectional view shown in FIG. 4.

FIG. 5a is an enlarged version of the mounting arrangement between the drive unit 16 and the running gear leg 14 shown in FIG. 4. FIG. 5b shows the enlarged version of the mounting arrangement of FIG. 5a, with the drive unit 16 being in a disengaged position with respect to the first and second wheel axis gears 8, 10.

The drive unit 16 comprises an engagement/disengagement mechanism 90. The drive unit further comprises an engagement control arm 94, to which the engagement/disengagement mechanism 90 is coupled, for example by a bolt, screw, rod, or the like. The engagement/disengagement mechanism 90 comprises a bell crank having an actuator 92 and a connection element 96. The actuator 92 and the connection element 96 are connected in a way that allows rotation with respect to each other, for example by a bolt, screw, rod, or the like. The connection element 96 is the portion of the engagement/disengagement mechanism 90 that is connected to the engagement control arm 94. The actuator 92 is fixed to the supporting portion 86 at its one end. Its other end comprises the connection to the connection element 96. The actuator 92 has a variable length in its longitudinal extension between the one end fixed to the supporting portion 86 and the other end connected to the connection element 96. Varying the length of the actuator 92 results in the connection between the actuator 92 and the connection element 96 to be displaced along a bottom plane 98 of the recess of the supporting portion 86 provided for receiving the mounting arm 88 of the drive unit 16. This results in an according motion of the connection element 96, the engagement control arm 94 and the drive unit 16. The actuator 92 may be an electric, hydraulic or pneumatic actuator. The operation of the actuator 92 results in a change of the length of the actuator 92, which may be achieved by providing a piston slidingly positioned in the actuator 92.

In FIG. 5a, the drive unit 16 is shown in a position of engagement with the first and second wheel axis gears. In the engagement position, the length of the actuator 92 is minimal. The connection element 96 is drawn towards the running gear leg 14, which in turn pulls the engagement control arm 94 towards the running gear leg 14. This in turn pulls the lower portion of the drive unit 16, i.e. the part of the drive unit 16 below the mounting arm 88, towards the running gear leg 16. This results in the first and second output stage gears engaging with the first and second wheel axis gears.

In FIG. 5b, the drive unit 16 is shown in a position of disengagement with respect to the first and second wheel axis gears. As compared to FIG. 5a, the actuator 92 is extended in length. This results in the connection between the actuator 92 and the connection element 96 to be moved away from the running gear leg 14 and down the bottom plane 98 of the recess of the supporting portion 86, as compared to the positioning of FIG. 5a. The connection element 96 is also in a position further removed from the running gear leg 14, which results in the engagement control arm 94 of the drive unit to be further away from the running gear leg 14 as well, such that the drive unit 16 is disengaged with respect to the first and second wheel axis gears. Accordingly, the length of the actuator 92 determines if a state of engagement or disengagement is present. Accordingly, the drive unit 16 can be engaged/disengaged by varying the length of the actuator 92.

The actuator 92 and the connection element 96 form a bell crank, which allows for the engagement/disengagement mechanism 90 to be self-securing, which will be discussed as follows. In the disengagement position, shown in FIG. 5b, the orientation of the connection element 96 is substantially perpendicular to the bottom plane 98. The weight of the drive unit 16 is partially supported by the mounting arm 88 and partially by the connection element 96. Through the connection element 96, a force normal to the bottom plane 98 is exerted onto the supporting portion 86. With the force being normal to the bottom plane 98, no force for moving the connection between the actuator 92 and the connection element 96 along the bottom plane 98 is caused by the drive unit's weight in the disengagement position. Thus, in the disengagement position, no force needs to be provided by the actuator to keep the drive unit 16 disengaged. Accordingly, should the actuator fail while the drive unit is disengaged, there is no danger of the drive unit 16 inadvertently engaging with the first and second wheel axis gears. An active operation by the actuator 92 is required to bring the drive unit 16 and the wheel structure into engagement. Hence, no damage can be caused to the drive unit 16 or the wheel structure through an unwanted engagement, for example during the landing of the aircraft, when the wheels rotate at high speeds due to the airplane's landing speed. Also, it is ensured that the drive unit 16 is no safety hazard, as an unwanted engagement during take-off or landing could have severe consequences. Therefore, the engagement/disengagement mechanism 90 is considered self-securing.

FIG. 6 shows a portion of an aircraft running gear 2 in accordance with a second embodiment of the invention. To a large extent, the second embodiment of FIG. 6 corresponds to the first embodiment shown in FIGS. 1 through 5, such that like elements are denoted with like reference numerals. A description of like elements if omitted for brevity. However, the drive unit 16 of the second embodiment of the aircraft running gear 2 shown in FIG. 6 is designed partially differently. The drive unit 16 of FIG. 6 only has one motor 120. The motor 120 comprises a motor shaft 130, which comprises a bevel gear 140. The bevel gear 140 is in engagement with a bevel gear 152 of a differential gear 150. The differential gear 150 is coupled to the third and fourth gear elements, as described with respect to FIG. 3, via first and second planetary gears 46, 48, respectively, as also described with respect to FIG. 3. The differential gear 150 comprises a first shaft portion 166 and a second shaft portion 168. The first shaft portion 166 is supported within the recess of the third gear element 62, described with respect to FIG. 3. The second shaft portion 168 is supported within the recess of the fourth gear element 64, described with respect to FIG. 3. Through the supporting of the first and second shaft portions 166, 168 within the third and fourth gear elements 62, 64, a stable alignment between the differential gear 150 and the third and fourth gear elements 62, 64 is achieved.

The differential gear 150 allows for the third and fourth gear elements 62, 64 to be rotated at different speeds. This in turn allows for a rotation of the first and second output stage gears 62, 64 as well as the first and second wheels 4, 6 at different speeds as well. The differential gear has the innate property that it adjusts the relative speeds of its two outputs, i.e. of the first and second differential gear shafts 166, 168, according to the resistance experienced at the outputs. This allows for the outer wheel to be driven faster than the inner wheel during a turning maneuver. Accordingly, when the airplane, whose running gear is equipped with the drive unit 16 of FIG. 6, turns on an airfield, the differential gear 150 ensures that the first and second wheels rotate with their respective speeds according to the desired turning radius. Accordingly, the low wear and tear of the tires and the whole wheel structure that can be achieved through the provision of two motors, as described with reference to the first embodiment (FIGS. 1 through 5), can also be achieved by providing the differential gear 150. However, the motor 120 has to provide twice as much power as each of the first and second motors 18, 20 of the first embodiment to achieve the same driving capability for the first and second wheels 4,6.

FIG. 7 shows a portion of an aircraft running gear 2 in accordance with a third embodiment of the invention. To a large extent, the third embodiment of FIG. 7 corresponds to the first and second embodiments shown in FIGS. 1 through 6, such that like elements are denoted with like reference numerals. In particular, the first and second motors 18 and 20 as well as the gearbox 26 may be identical to the respective elements described with respect to the first embodiment. Also, these elements may be replaced by the alternative motor and gearbox arrangement as described with respect to the second embodiment. A description of these elements and other like elements is omitted for brevity. However, the aircraft running gear 2 of the third embodiment FIG. 7 is designed partially differently from the previous embodiments.

The viewing direction of FIG. 7a is similar to the viewing direction of FIG. 1. However, for better intelligibility, the first wheel 4 and the associated first rim 32 as well as the second wheel 6 are not shown. As is apparent, these elements are present in the aircraft running gear 2 in the operating state. Also, the shaft assembly 12 is configured slightly differently from the first and second embodiments. However, such shaft assembly may have any suitable construction and is not essential to the present invention.

The main differences between the aircraft running gear 2 of the first embodiment and the aircraft running gear 2 of the third embodiment are as follows: the first and second output stage gears 22 and 24 of the first embodiment are replaced with first and second power output assemblies 122 and 124, respectively. Also, the first and second wheel axis gears 8 and 10 are replaced with first and second sprocket elements 108 and 110, respectively.

Each of the first and second sprocket elements 108 and 110 is a ring-like structure having on its outer side two adjacent rows of sprocket teeth arranged along the perimeter of the respective sprocket element. Each of the first and second sprocket elements 108 and 110 is fixedly coupled to the rim of the respectively associated wheel 2 or 4. As described above with the first embodiment, each one of the sprocket elements 108 and 110 can either be coupled rigidly to the respective rim in a suitable manner or can be manufactured as one piece together with the respective rim. In any case, it is ensured that a turning of the sprocket elements leads to a turning of the associated wheels. It is also possible that the sprocket elements are not ring-like structures, but disk-like structures.

Each of the first and second power output assemblies 122 and 124 is an arm-like structure that is coupled to the gearbox 26 at one of its ends. For each of the first and second power output assemblies 122 and 124, a two-row power transmission chain runs endlessly along the arm-like structure. In particular, the two-row power transmission chain runs endlessly over two first sprocket wheels at said one end of the arm-like structure and over two second sprocket wheels at the other end of the arm-like structure, as will be described in greater detail with respect to FIG. 8. The first sprocket wheels are drivingly coupled to the gearbox 26.

The first and second power output assemblies 122 and 124 are respectively rotatable around the output stage axis of the gearbox 26, as defined as output stage axis B with regard to the first embodiment and shown in FIG. 1. In FIG. 7a, it is shown how the directions of longitudinal extension of the arm-like structures of FIGS. 7a and 7b are in parallel with the longitudinal extension of the drive unit 16. The power transmission chains of the first and second power output assemblies 122 and 124 are not in engagement with the first and second sprocket elements 108 and 110, respectively. Accordingly, the power transmission chains are in a position of disengagement from the first and second sprocket elements 108 and 110.

In contrast thereto, FIG. 7b shows an instance wherein the power transmission chain of the first power output assembly 122 is in engagement with the first sprocket element 108. Said engagement is effected by means of rotating the first power output assembly 122 around the output stage axis of the gearbox 26. In other words, the direction of longitudinal extension of the first power output assembly 122 is rotated with respect to the direction of longitudinal extension of the drive unit 16. The directions of longitudinal extension of the first power output assembly 122 and the drive unit 16 are no longer parallel to each other, but are still located in parallel planes.

FIG. 7b shows only the first power output assembly 122 to be in a position of engagement with the first sprocket element 108. The second power output assembly 124 is shown to be in a position of disengagement from the second sprocket element 110. Under normal operating conditions, it will typically be the case that either both power output assemblies 122 and 124 are in a state of engagement or both power output assemblies 122 and 124 are in a state of disengagement. However, for a better illustration of the different operating positions, the first and second power output assemblies 122 and 124 are shown in different positions in FIG. 7b.

The operation of the aircraft running gear 2 according to the third embodiment is described as follows. When the aircraft having the aircraft running gear 2 does not need the drive unit 16 to drive the aircraft, such as during dragging or pushing of the aircraft by a special vehicle or during take-off or landing, the first and second power output assemblies 122 and 124 are in the positions of disengagement shown in FIG. 7a. The two wheels (not shown) can rotate independently from the drive unit 16. When driving the aircraft via the aircraft running gear 2 is desired, such as during taxiing, the two power output assemblies 122 and 124 are rotated to be in the position of engagement, as shown with respect to the first power output assembly 122 in FIG. 7b. The power transmission chains of the power output assemblies 122 and 124 are driven by the first and second motors 18 and 20 via the gearbox 26, such that the power transmission chains transfer the driving power to the first and second sprocket elements 108 and 110 and thus to the first and second wheels (not shown).

It is pointed out that each of the first and second power output assemblies 122 and 124 could be designed to comprise other power transmission chains than the shown two-row power transmission chains. In particular, there could be provided 1 or 2 or 3 or 4 or 5 or more individual, i.e. single-row, power transmission chains per power output assembly. It is also possible that a multi-row power transmission chain with 3 or 4 or 5 or more adjacent rows is provided per power output assembly. The first and second sprocket elements 108 and 110 would then have a corresponding number of adjacent rows of sprocket teeth for being selectively engageable to the respective power transmission chain(s). Also, the power output assemblies would have a corresponding number of adjacent first sprocket wheels and second sprocket wheels.

FIGS. 8a and 8b show the aircraft running gear 2 according to the third embodiment from its right side (in the drawing plane of FIG. 7), with the operating conditions of FIGS. 8a and 8b corresponding to the respective operating conditions of FIGS. 7a and 7b. As the first wheel 4 and the first rim 32 are again omitted for better illustration, the view of FIG. 8 corresponds to a cross section through the aircraft running gear 2 on the inside of the first wheel 4. In contrast to FIG. 7, FIG. 8 shows the second wheel 6.

The first power output assembly 122, which is depicted in FIG. 8, is described in more detail. Due to the viewing direction, only the side face of the power transmission chain 136 can be seen. Of course, as described above, two or more power transmission chains and/or power transmission chains having two or more rows may be present per power output assembly.

The power output assembly 122 comprises a first sprocket wheel 132 and a second sprocket wheel 134. A power transmission chain 136 is arranged between the first and second sprocket wheels 132 and 134. In particular, the power transmission chain 136 runs around the first and second sprocket wheels 132 and 134 in an endless manner. The first and second sprocket wheels 132 and 134 are positioned substantially at the ends of the first power output assembly 122. which has an arm-like shape. The arm has a substantially linear direction of extension.

The power transmission chain 136 forms a loop around the first and second sprocket wheels 132 and 134. The loop comprises two legs in between the first and second sprocket wheels 132 and 134. A first leg faces the first sprocket element 108, while the second leg faces away from the first sprocket element 108. The second leg is substantially straight between the first and second sprocket wheels 132 and 134. The first leg has a concave shape, with the concave shape having a radius that is slightly larger than the radius of the first sprocket elements 108. The first leg of the power transmission chain 136 is kept in the described shape by a chain guiding structure, which forces the power transmission chain to maintain the concave shape, even when the first power output assembly is in a disengaged position, as shown in FIG. 8a. In FIG. 8b, it is shown that the concave shape of the first leg allows for an extended engagement section of the loop of the power transmission chain 136, such that the driving forces may be transferred from the power transmission chain 136 onto the first sprocket element 108 over a plurality of sprocket teeth and chain elements. In this way, a distributed force transfer is achieved, giving the arrangement high performance and strong durability.

It is emphasized that all aspects described with respect to the first or second power output assembly equally apply to the other one of the first and second power output assemblies.

It is pointed out that each combination of a power output assembly, as described, and a sprocket element, as described, also provides an output gear ratio, as described above with respect to the first embodiment with regard to the output stage gear and the wheel axis gear. The output gear ratio of the third embodiment is defined as the radius of the sprocket element 108 divided by the radius of the first sprocket wheel 132. Above described considerations are therefore equally applicable to the third embodiment.

According to an alternative embodiment, the first and second motors 18 and 20 and the gearbox 26 may be replaced with another motor-gearbox-assembly, whose direction of longitudinal extension is either identical with or parallel to the axis through the first sprocket wheels of the first and second power output assemblies 122 and 124, one of which being shown with reference numeral 132 in FIG. 8. Also in this embodiment, the power may be transferred from the drive unit towards the wheels in an efficient and durable manner via the first and second power output assemblies 122 and 124 having respective power transmission chains.

Figure 9:
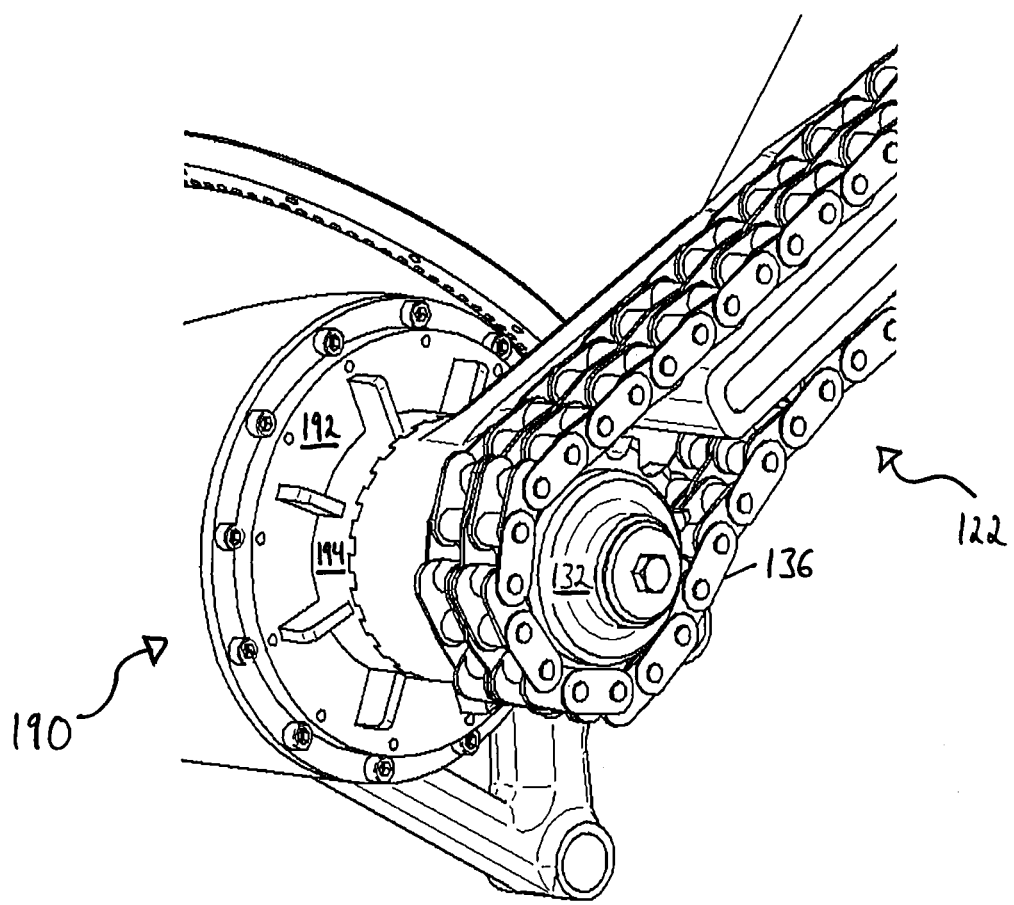
FIG. 9 shows an enlarged and more detailed portion of the three-dimensional representation of FIG. 7.

FIG. 9 shows an enlarged and more detailed section of the aircraft running gear according to the third embodiment as shown in FIGS. 7 and 8. It shows a pivoting cylinder arranged between the gearbox 26 and the first sprocket wheel 132. The pivoting cylinder 190 on the one hand effects the rotation of the first power output assembly 122. For this purpose, the pivoting cylinder comprises a fixed part 192, which is fixedly coupled to the gearbox 26, and a rotatable part 194, which is axially coupled to the fixed part 192, but can rotate with respect to the fixed part 192. Both of the fixed part 192 and the rotatable part 194 comprise four fins having a distance of 90° from each other, respectively. The fins restrict the relative motion of the rotatable part 194 with respect to the fixed part 192 to close to 90°. Alternatively, other numbers of fins, such as six fins for both the fixed part and the rotatable part, and other angle restrictions, such as a restriction to close to 60°, may also be used. The oil pressure within the pivoting cylinder 190 determines the rotation of the rotatable part 194, such that a desired degree of rotation may be achieved by controlling said oil pressure. The rotatable part is fixedly coupled to the arm-like structure of the first power output assembly 122 via suitable gears or any other suitable connection. On the other hand, the pivoting cylinder allows for the transfer of the driving power from the gearbox 26 to the first sprocket wheel 132. For this purpose, the driving connection between the gearbox 26 and the first sprocket wheel extends through the pivoting cylinder 190. In this way, a very compact rotating mechanism for rotating the power output assemblies is provided. It is however pointed out that other suitable rotating mechanisms may be used as well.

All embodiments described may also be embodied with one power output assembly or one output stage gear only. In this case, only one motor is required, and no differential has to be provided. In this case, only one of the two wheels is driven by the drive unit. The other wheel is provided in such a way that its rotation speed may differ from the rotation speed of the driven wheel. In case of the third embodiment, the drive unit would for example have the first power output assembly 122 as the only power output assembly. Also, the first sprocket element 108 would be the only sprocket element of the aircraft running gear. In this way, the drive unit could drive the first wheel 4, with the second wheel 6 adapting to the driving of the first wheel 4 as a passive component. All variations described above are equally applicable to such an embodiment.

The invention claimed is:

1. A drive unit (16) for an aircraft running gear (2) having at least a first wheel (4) and a second wheel (6) on a common wheel axis (A), wherein the drive unit (16) is drivingly coupleable to at least one of the first and second wheels (4, 6), characterized in that the drive unit (16) comprises:
at least one power output assembly (122, 124) for driving at least one of the first and second wheels (4, 6), with each of the at least one power output assembly (122, 124) comprising a power transmission chain (136) selectively engageable with a sprocket element (108, 110) coupled to one of the first and second wheels (4, 6), with the power transmission chain (136) being moveable in operation of the drive unit between a position of engagement with the sprocket element and a position of disengagement with the sprocket element.

2. The drive unit (16) according to claim 1, wherein the drive unit (16) is drivingly coupleable to both the first and second wheels (4, 6), wherein the drive unit (16) comprises a first and a second power output assembly (122, 124) for driving a respective one of the first and second wheels (4, 6), with each power output assembly (122, 124) comprising a power transmission chain (136) selectively engageable with a respective sprocket element (108, 110) coupled to the respective wheel (4, 6).

3. The drive unit (16) according to claim 2, comprising:
a first motor (18) drivingly coupleable to the first wheel (4) via a first gear structure and the first power output assembly (122), and a second motor (20) drivingly coupleable to the second wheel (6) via a second gear structure and the second power output assembly (124), wherein the first and second motors (18, 20) are arranged in tandem along the direction of longitudinal extension (C) of the drive unit (16).

4. The drive unit (16) according to claim 3, wherein:
the first motor (18) in operation drives a first bevel gear (38), with the first bevel gear (38) being drivingly coupleable to the first wheel (4) via the first gear structure and the first power output assembly (122), and the second motor (20) in operation drives a second bevel gear (40), with the second bevel gear (40) being drivingly coupleable to the second wheel (6) via the second gear structure and the second power output assembly (124).

5. The drive unit (16) according to claim 3, wherein the first and second motors (18, 20) are arranged in a coaxial manner.

6. The drive unit (16) according to claim 3, wherein the first motor (18) has a first motor shaft (28) and the second motor (20) has a second motor shaft (30), with the first motor shaft (28) being hollow and being arranged around the second motor shaft (30).

7. The drive unit (16) according to claim 3, wherein the first and second motors (18, 20) are electric motors or hydraulic motors.

8. The drive unit (16) according to claim 3, wherein
the first gear structure comprises a first gear element (42) having a third bevel gear (54) and a first gear element shaft (66) and the second gear structure comprises a second gear element (44) having a fourth bevel gear (56) and a second gear element shaft (68), with one of the first and second gear element shafts (66, 68) having a hollow portion and the other one of the first and second gear element shafts (66, 68) being supported in the hollow portion.

9. The drive unit (16) according to claim 3, wherein the first and second gear structures comprise a planetary gear (46, 48), respectively.

10. The drive unit (16) according to claim 2, comprising:
a motor (120) and a differential gear (150), with the motor (120) being drivingly coupleable to the first and second wheels (4, 6) via the differential gear (150) and the first and second power output assemblies (122, 124).

11. The drive unit (16) according to claim 10, wherein the motor (120) comprises a bevel gear (140) for engaging with the differential gear (150).

12. The drive unit (16) according to claim 10, wherein the differential gear (150) is coupleable to the first and second wheels (4, 6) by first and second gear structures and the first and second power output assemblies (122, 124), respectively.

13. The drive unit (16) according to claim 10, wherein the differential gear (150) is a bevel differential or planetary differential or ball differential or face gear differential.

14. The drive unit (16) according to claim 10, wherein the motor (120) is an electric motor or a hydraulic motor.

15. The drive unit (16) according to claim 1, wherein each power output assembly (122, 124) comprises a first sprocket wheel (132) and a second sprocket wheel (134), with the power transmission chain (136) running endlessly over the first sprocket wheel (132) and the second sprocket wheel (134).

16. The drive unit (16) according to claim 15, wherein the first sprocket wheel (132) is drivingly coupled to a power train of the drive unit (16).

17. The drive unit (16) according to claim 16, wherein the second sprocket wheel (134) is an idler sprocket wheel.

18. The drive unit (16) according to claim 16, wherein both the first sprocket wheel (132) and the second sprocket wheel (134) are drivingly coupled to the power train of the drive unit (16).

19. The drive unit (16) according to claim 15, wherein the power transmission chain (136) is in engagement with the first and second sprocket wheels (132, 134) on an inner side of the power transmission chain (136).

20. The drive unit (16) according to claim 15, wherein the first sprocket wheel (132) of the first power output assembly (122) and the first sprocket wheel of the second power output assembly (124) are aligned on a common output stage axis, which is substantially orthogonal to a direction of longitudinal extension (C) of the drive unit (16).

21. The drive unit (16) according to claim 1, wherein the power transmission chain (136) is selectively engageable with the sprocket element (108) on an outer side of the power transmission chain (136).

22. The drive unit (16) according to claim 1, wherein the endless power transmission chain (136) defines a loop and is selectively engageable with the sprocket element (108) in a preset engagement section of the loop.

23. The drive unit (16) according to claim 22, wherein the engagement section is between the first and second sprocket wheels (132, 134).

24. The drive unit (16) according to claim 22, wherein a guiding of the power transmission chain (136) in the engagement section is provided, the guiding preferably being adapted to a shape of the sprocket element.

25. The drive unit (16) according to claim 22, wherein the loop is convex with the exception of the engagement section where the loop is concave.

26. The drive unit (16) according to claim 1, wherein each of the at least one power output assembly (122, 124) is in the form of an arm, with the power transmission chain (136) being arranged along the respective arm.

27. The drive unit (16) according to claim 26, wherein the arm is rotatable around a rotation axis fixed with respect to the remainder of the drive unit (16).

28. The drive unit (16) according to claim 27, wherein the rotation axis substantially corresponds to an axis of the first sprocket wheel (132).

29. The drive unit (16) according to claim 26, wherein the arm is rotatable by means of a hydraulic or electric actuator.

30. The drive unit (16) according to claim 1, wherein each of the at least one power output assembly (122, 124) comprises a pivoting cylinder for rotating the respective power output assembly.

31. The drive unit (16) according to claim 30, wherein an axis of the pivoting cylinder substantially corresponds to a rotation axis of the respective power output assembly (122, 124).

32. The drive unit (16) according to claim 30, wherein the pivoting cylinder is a hydraulic actuator.

33. The drive unit (16) according to claim 1, wherein the power transmission chain (136) is one of a roller chain, a sleeve type chain, and Galle-chain.

34. The drive unit (16) according to claim 1, wherein each one of the at least one power output assembly (122, 124) comprises a plurality of power transmission chains running in parallel or wherein each one of the at least one power output assembly (122, 124) comprises a multi-row power transmission chain.

35. The drive unit (16) according to claim 1, wherein a direction of longitudinal extension (C) of the drive unit (16) is in a plane orthogonal to the common wheel axis (A).

36. The drive unit (16) according to claim 1, wherein the drive unit comprises a mounting structure for being mounted to the aircraft running gear and the entire drive unit (16) with the exception of the mounting structure is movable with respect thereto such that the power transmission chain (136) is selectively engageable with the sprocket element (108).

37. The drive unit (16) according to claim 36, wherein the drive unit (16) with the exception of the mounting structure is at least one of pivotally rotatable and laterally displacable with respect to the mounting structure.

38. The drive unit (16) according to claim 36, wherein the drive unit (16) with the exception of the mounting structure is movable by means of an electric or hydraulic actuator.

39. The drive unit (16) according to claim 1, comprising an integrated free-wheel arrangement.

40. The drive unit (16) according to claim 39, wherein a free wheeling direction of the free-wheel arrangement is reversible.

41. The drive unit (16) according to claim 1, comprising a self-securing engagement/disengagement mechanism.

42. The drive unit (16) according to claim 41, wherein the self-securing engagement/disengagement mechanism is operated in a pneumatic, hydraulic or electric manner.

43. The drive unit (16) according to claim 1, comprising an engagement/disengagement mechanism adapted to synchronize the rotating speed of the power transmission chain (136) of each of the at least one power output assembly (122, 124) with the respective sprocket element (108, 110) by sensing the wheel speed and adjusting the motor speed.

44. The drive unit according to claim 43, comprising a sensing device for sensing the relative positioning of sprocket teeth for targeted engaging of the power transmission chain of each of the at least one power output assembly (122, 124) with the respective sprocket element (108, 110).

45. An aircraft running gear (2), comprising:
at least a first wheel (4) and a second wheel (6) on a common wheel axis (A), and
a drive unit (16) drivingly coupleable to at least one of the first and second wheels (4, 6), the drive unit comprising
at least one power output assembly (122, 124) for driving at least one of the first and second wheels (4, 6), with each of the at least one power output assembly (122, 124) comprising a power transmission chain (136) selectively engageable with a sprocket element (108, 110) coupled to one of the first and second wheels (4, 6), with the power transmission chain (136) being moveable in operation of the drive unit between a position of engagement with the sprocket element and a position of disengagement with the sprocket element.

46. The aircraft running gear (2) according to claim 45, comprising:
a first sprocket element (108), which is coupled to the first wheel (4), engageable to the power transmission chain (108) of the first power output assembly (122) of the drive unit (16), and a second sprocket element (110), which is coupled to the second wheel (6), engageable to the power transmission chain of the second power output assembly (124) of the drive unit (16).

47. The aircraft running gear (2) according to claim 46, wherein the first and second sprocket elements (108, 110) are mounted on a respective rim of the first and second wheels (4, 6).

48. The aircraft running gear (2) according to claim 45, having a running gear leg (14) supporting the first and second wheels (4, 6), with the drive unit (16) being mounted to the running gear leg (14).

49. The aircraft running gear (2) according to claim 48, wherein a direction of longitudinal extension of the drive unit (16) is substantially parallel to the running gear leg (14).

50. The aircraft running gear (2) according to claim 45 adapted to be used as a nose running gear or a main running gear.

51. The aircraft running gear (2) according to claim 45, wherein at least one of the first and second sprocket elements (108, 110) and the respective rims are made of light metal, such as aluminum or titanium.

* * * * *